US012779497B2

(12) United States Patent
Shimomura et al.

(10) Patent No.: US 12,779,497 B2
(45) Date of Patent: Nov. 3, 2026

(54) VIBRATION ACTUATOR AND ELECTRONIC APPARATUS

(71) Applicants: Shigeyuki Shimomura, Tokyo (JP); Yosuke Kinoshita, Tokyo (JP)

(72) Inventors: Shigeyuki Shimomura, Tokyo (JP); Yosuke Kinoshita, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 140 days.

(21) Appl. No.: 18/870,414

(22) PCT Filed: May 30, 2023

(86) PCT No.: PCT/JP2023/020093
§ 371 (c)(1),
(2) Date: Nov. 28, 2024

(87) PCT Pub. No.: WO2023/234293
PCT Pub. Date: Dec. 7, 2023

(65) Prior Publication Data

US 2025/0332612 A1 Oct. 30, 2025

(30) Foreign Application Priority Data

May 31, 2022 (JP) ................................ 2022-088795

(51) Int. Cl.
*B06B 1/04* (2006.01)
*H02K 33/12* (2006.01)

(52) U.S. Cl.
CPC ............ *B06B 1/045* (2013.01); *H02K 33/12* (2013.01)

(58) Field of Classification Search
CPC .......... B06B 1/045; B06B 1/04; H02K 33/12; H02K 33/16
See application file for complete search history.

(56) References Cited

U.S. PATENT DOCUMENTS

2020/0389078 A1* 12/2020 Takahashi .............. H02K 33/02

FOREIGN PATENT DOCUMENTS

JP 3748637 2/2006

* cited by examiner

*Primary Examiner* — Joseph Ortega

(57) ABSTRACT

This vibration actuator has: a movable stacked body including a magnet and a pair of yokes which are respectively fixed to the front surface and the rear surface of the magnet; a fixed body which has a coil and supports the movable stacked body on the inside of the coil with a pair of elastic support parts; and a pair of connection parts. While the leading ends of shaft members are in contact with the front surface or the rear surface of the magnet in openings of the pair of yokes, the pair of connection parts cause the movable stacked body to be connected to the pair of elastic support parts by clamping the pair of elastic support parts by means of a flange of the shaft members and the base end-side end surface of a cylindrical member.

7 Claims, 13 Drawing Sheets

1

VIBRATION ACTUATOR AND ELECTRONIC APPARATUS

TECHNICAL FIELD

The present invention relates to a vibration actuator and an electronic device including the vibration actuator.

BACKGROUND ART

Conventionally, electronic devices having a vibrating function can notify a user of an incoming call or improve an operational feel and/or realism by driving the vibration actuator to transmit vibrations to the user to give a physical feeling. Examples of the electronic devices include a portable game terminal, a controller (game pad) of a stationary game machine, a portable communication terminal such as a mobile phone or a smart phone, a portable information terminal such as a tablet PC, and a portable device such as a wearable terminal capable of being worn on clothes or an arm.

A vibration actuator used in a pager or the like as disclosed in Patent Literature (hereinafter, referred to as "PTL") 1 has been known as a vibration actuator of a miniaturizable structure mounted on a portable device, for example.

This vibration actuator includes a pair of plate-like elastic bodies that are supported respectively on opening edge portions of a cylindrical frame such that the elastic bodies face each other. Each of the plate-like elastic bodies is disposed such that one end portion is fixed to a fixing body, and the other end portion is fixed to a movable body or a part of a movable side. One of the plate-like elastic bodies which has a spiral shape is formed such that an outer circumferential portion being the one end portion is disposed at a bottom portion of a frame body, and a central portion being the other end portion is raised from the outer circumferential portion. A yoke to which a magnet is attached is fixed to this central portion, and the yoke is supported in the frame.

The yoke, together with the magnet, forms a magnetic field generator, and a coil attached to the other plate-like elastic body is disposed in the magnetic field of this magnetic field generator. The coil is cylindrically formed using an enameled wire obtained by baking a resin on the surface of a copper wire. The coil is a so-called air-core coil using a self-bonding wire, and thus occupies a smaller arrangement space. The pair of plate-like elastic bodies are selectively resonated to generate vibrations by application of switched currents of different frequencies through an oscillation circuit to the coil, so that the yoke vibrates in the center-line direction of the frame within the frame.

In this vibration actuator, it is designed so that the distance between the magnet and the coil and between the yoke and the coil is greater than the distance between the yoke and the inner circumferential wall of the frame. Thus, in the event of an external impact, the yoke first collides with the inner circumferential wall (soft elastic body) of the frame, preventing the yoke and magnet from contacting and damaging the coil.

CITATION LIST

Patent Literature

PTL 1
Japanese Patent No. 3748637

SUMMARY OF INVENTION

Technical Problem

However, in recent years, with the miniaturization of products equipped with vibration actuators and the reduction of installation space in those products, efforts have been made to miniaturize the vibration actuator itself.

However, in the configuration of the above-mentioned vibration actuator, miniaturization was difficult because it is necessary to secure both the distance between the yoke and the inner wall of the frame and the distance between the magnet and the coil and between the yoke and the coil, and to make the latter distance larger than the former.

Further, since the movable body is supported by a spiral-shaped plate-like elastic body on one side in the vibration direction in conventional vibration actuators, there is a risk of vibrating at an angle to the vibration direction, and there has been a demand for more stable vibration along the vibration direction.

The aim of the present invention is to provide a vibration actuator and an electronic device that can be made small and thin, and can vibrate at a high output stably.

Solution to Problem

One aspect of the vibration actuator of the present invention is configured to includes:

a movable stacked body including a magnet and a pair of yokes, the yokes being fixed respectively to a front surface and a back surface of the magnet and including opening portions at centers, respectively;

a fixed body including a coil and being configured to support the movable stacked body inside the coil such that the movable stacked body is capable of a reciprocating vibration in an axial direction via a pair of elastic supporting parts;

a pair of connecting parts, each of which includes a tubular member and a shaft member, the shaft member being inserted into the tubular member and including a flange at a base end, in which each of the pair of connecting parts connects the movable stacked body to a corresponding one of the pair of elastic supporting parts by sandwiching the elastic supporting part between the flange of the shaft member and a base-end-side end surface of the tubular member in a state where a tip end of the shaft member is in contact with the front surface or the back surface of the magnet inside a corresponding one of the opening portions of the pair of yokes.

One aspect of the electronic device of the present invention employs a configuration in which the vibration actuator of the above configuration is mounted.

Advantageous Effects of Invention

According to the present invention, it is possible to make it small and thin, and a vibration can be performed with a high output stably.

DESCRIPTION OF EMBODIMENTS

Hereinafter, an embodiment of the present invention will be described in detail with reference to the drawings.

Embodiment 1

[Overall Configuration of Vibration Actuator]

Figure 1:
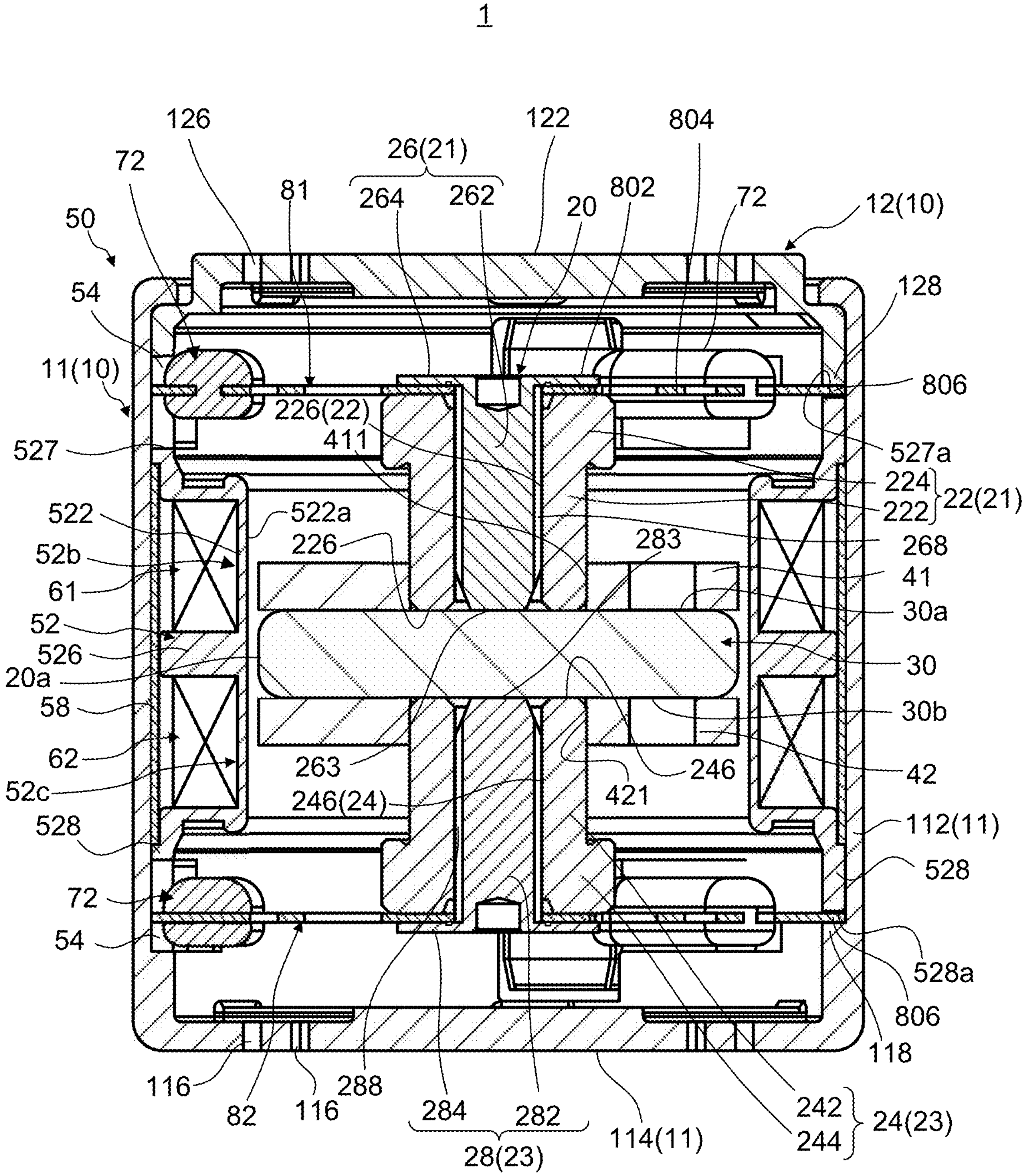
FIG. 1 is a longitudinal sectional view of a vibration actuator according to an embodiment of the present invention.
Figure 2:
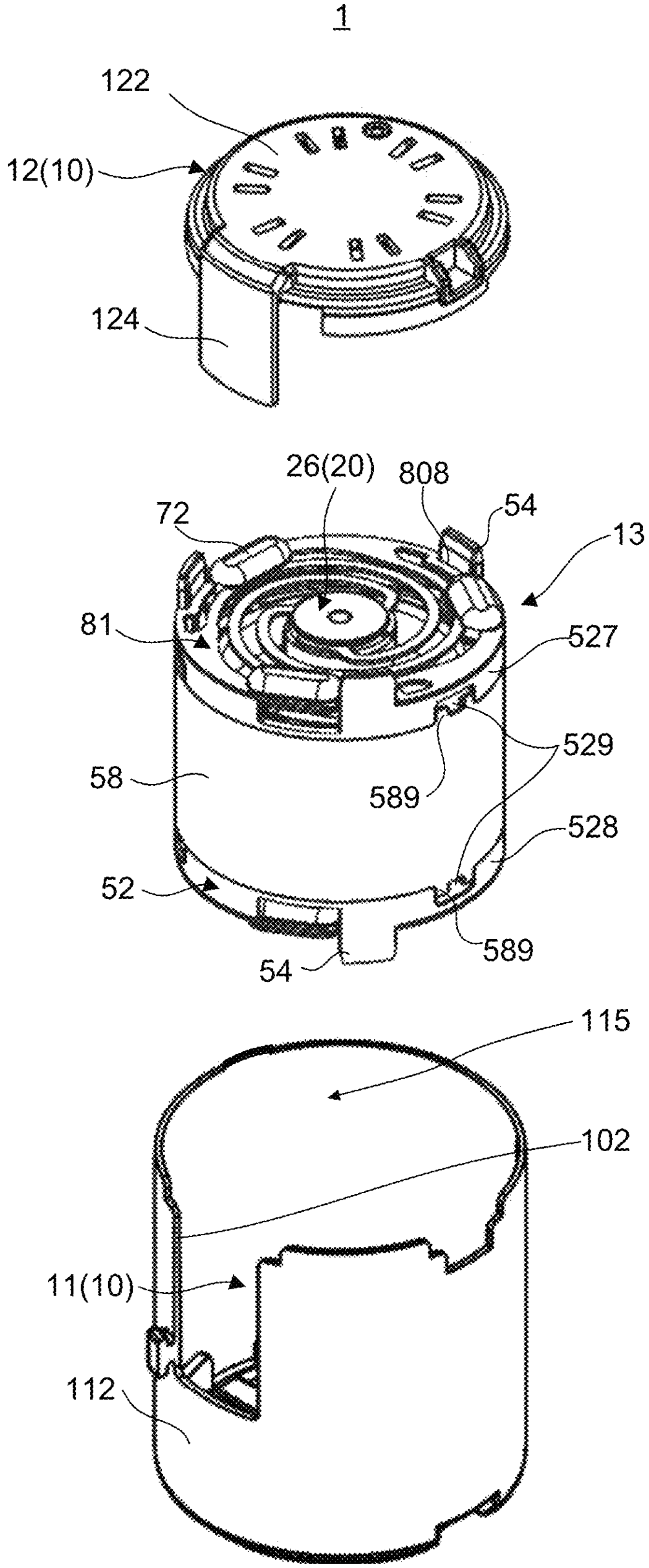
FIG. 2 is a perspective view of a drive unit with a case removed in the vibration actuator according to an embodiment of the present invention.
Figure 3:
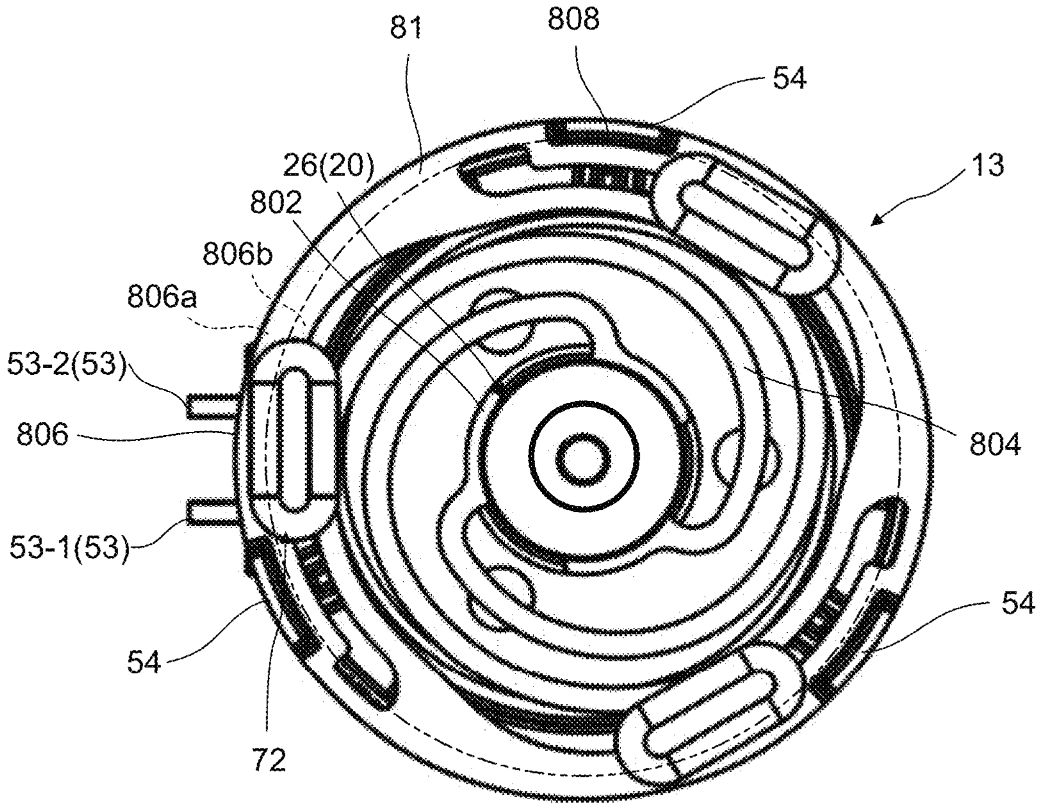
FIG. 3 is a plan view of the drive unit shown in FIG. 2.
Figure 4:
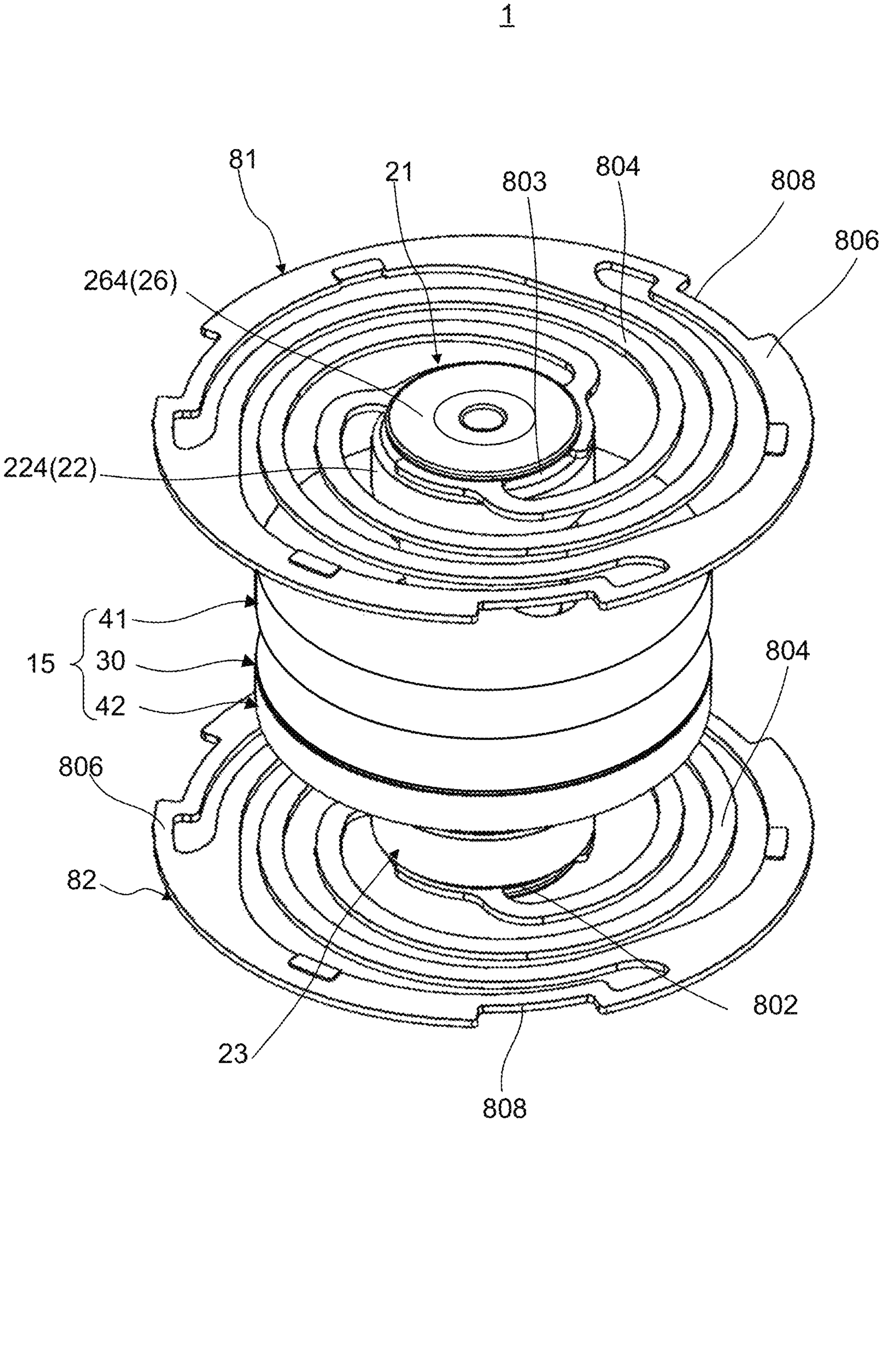
FIG. 4 is a perspective view of a movable body to which elastic supporting parts are fixed.
Figure 5:
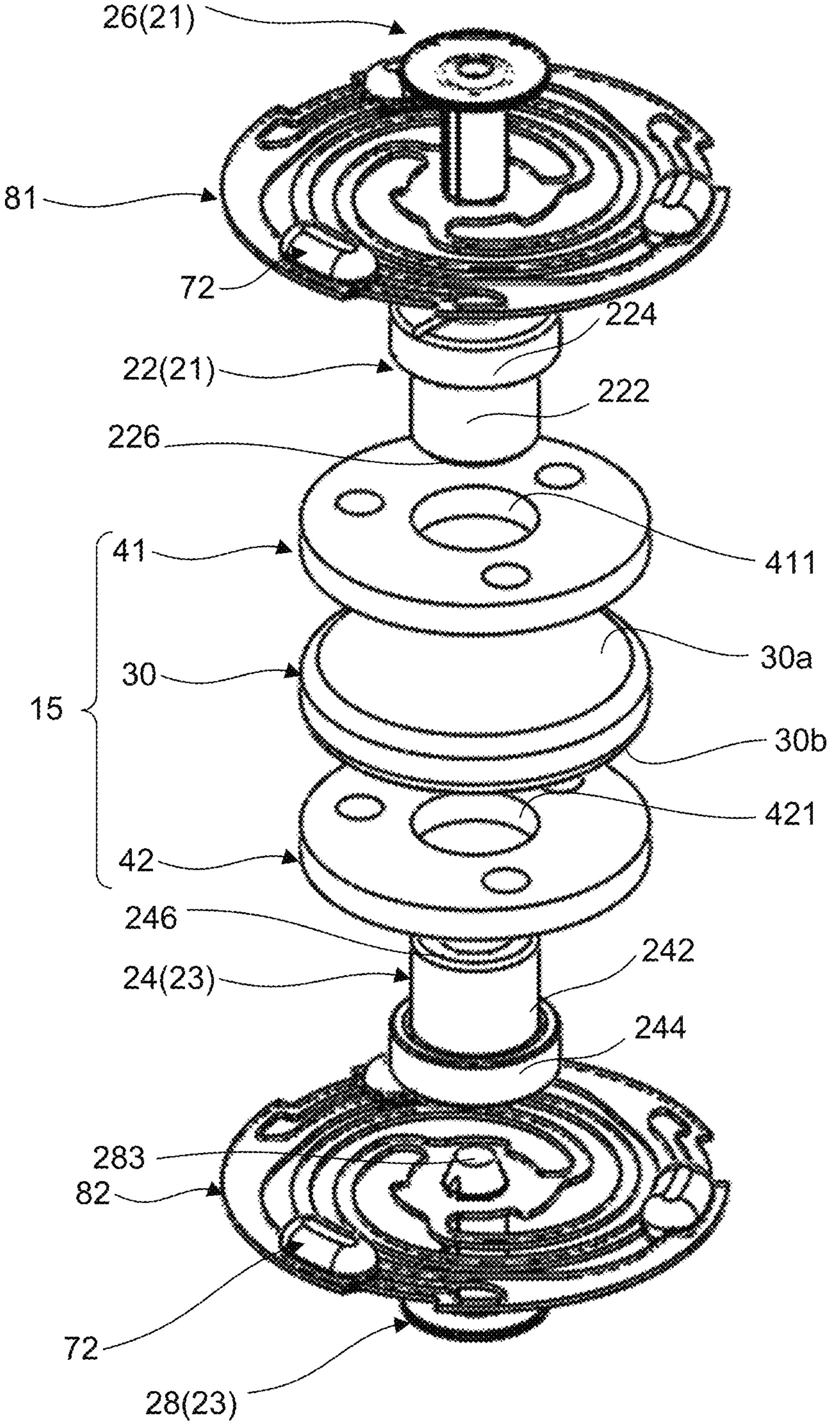
FIG. 5 is an exploded perspective view of FIG. 4.

FIG. 1 is a longitudinal sectional view of a vibration actuator according to an embodiment of the present invention, and FIG. 2 is a perspective view of a drive unit with the case removed in the vibration actuator according to an embodiment of the present invention. Further, FIG. 3 is a plan view of the drive unit shown in FIG. 2, FIG. 4 is a perspective view showing a movable body with elastic supporting parts fixed, and FIG. 5 is an exploded perspective view of FIG. 4.

Note that the "upper" side and the "lower" side in the present embodiment are given for convenience of understanding, and mean one side and the other side in the vibration actuator of the movable body in the vibration direction. That is, when the vibration actuator is mounted on an electronic device (see FIGS. 14 and 15), the upper and lower sides may be reversed, or may also be left and right.

Vibration actuator 1 according to Embodiment 1 is mounted as a vibration source on an electronic device such as a portable game terminal device (for example, game controller GC illustrated in FIG. 14) to implement a vibrating function of the electronic device. Examples of this electronic device include a portable device such as a smart phone (for example, mobile terminal M illustrated in FIG. 15). Vibration actuator 1 is mounted on a device such as a portable game terminal device or a portable device, and is driven to vibrate to notify a user of an incoming call or to give an operational feel or realism.

As illustrated in FIGS. 1 and 2, vibration actuator 1 of the present embodiment accommodates, in hollow case 10, movable body 20 such that movable body 20 is capable of vibrating in the axial direction (upper-lower direction) of case 10, which is the vibration direction, between upper and lower end surfaces. Movable body 20 vibrates inside case 10 to allow vibration actuator 1 itself to function as a vibration body.

Vibration actuator 1 includes: movable body 20 with magnet 30, a pair of yokes 41 and 42, and a pair of connecting parts 21 and 23; fixed body 50 with a pair of coils 61 and 62; and elastic supporting parts 81 and 82. Movable body 20 is supported with respect to fixed body 50 via a pair of elastic supporting parts 81 and 82 to reciprocate.

In vibration actuator 1, coils 61 and 62, magnet 30, first yoke 41, and second yoke 42, together with outer yoke 58, constitute a magnetic circuit that vibrates movable body 20. Vibration actuator 1, by being powered from a power supply section (for example, drive control part 203 shown in FIGS. 14 and 15), causes coils 61 and 62 and magnet 30 to cooperate, making movable body 20 reciprocate in the vibration direction within case 10. In vibration actuator 1 of the present embodiment, bobbin main-body portion (coil protection wall portion) 522 disposed between movable body 20 and coils 61 and 62 allows movable body 20 to reciprocate in the axial direction of coils 61 and 62 (i.e., the vibration direction) inside coils 61 and 62 held by coil bobbin part 52. The axial direction of coils 61 and 62 is the vibration direction of movable body 20, is also the magnetization direction of magnet 30, and is also the axial direction of coil bobbin part 52.

Movable body 20 is disposed via elastic supporting parts 81 and 82 such that, in a non-vibration (non-driven) state in which movable body 20 is not vibrating, the center of the length of movable body 20 in the vibration direction and the center of the length of coil bobbin part 52 in the vibration direction face each other in a direction orthogonal to the axial direction of movable body 20 with a predetermined gap being interposed between the movable body and the coil bobbin part.

At this time, it is desirable that movable body 20 be located at a position where movable body 20 is balanced between coils 61 and 62 without making contact with bobbin main-body portion 522 of coil bobbin part 52. In the present embodiment, it is preferable that the center of the length along magnet 30 and first and second yokes 41 and 42 in the vibration direction be disposed to face, in the direction orthogonal to the vibration direction, the center of the length of a space between vertically spaced coils 61 and 62 in the vibration direction. Note that, a magnetic fluid may be interposed between bobbin main-body portion 522 and movable body 20.

Vibration actuator 1 in the present embodiment includes driving unit 13 in case 10 including case main body 11 and lid portion 12 as illustrated in FIGS. 1 and 2. Driving unit 13 includes coils 61 and 62, coil bobbin part 52, movable body 20 and elastic supporting parts 81 and 82.

<Movable Body 20>

Movable body 20 is supported inside cylindrical coil bobbin part 52 of fixing body 50 by elastic supporting parts 81 and 82 connected to the upper and lower end portions of the movable body, such that the movable body is capable of reciprocating along coil bobbin part 52 (inner circumferential surface 522*a* of bobbin main-body portion 522). In other words, in vibration actuator 1, movable body 20 is supported to be capable of reciprocating in a direction in which lid portion 12 and bottom portion 114 face each other. Movable body 20 is disposed in driving unit 13 illustrated in FIG. 3.

As shown in FIGS. 1, 4, and 5, movable body 20 has magnet 30, a pair of yokes 41 and 42, and a pair of connecting parts 21 and 23 (tubular members 22 and 24 and shaft members 26 and 28). In this embodiment, magnet 30 is located at the center of movable body 20.

In movable body 20, first and second yokes 41 and 42 are stacked on the opposite sides of magnet 30 in the vibration direction (the vertical direction shown in FIGS. 1 to 5), and connecting parts 21 and 23 are connected in series to the pair of yokes (first and second yokes 42). Moreover, magnet 30 and the pair of yokes (first yoke 41 and second yoke 42) stacked and secured to constitute movable stacked body 15 (see FIGS. 4 and 5).

In movable body 20, outer circumferential surface 20*a* of magnet 30 and first and second yokes 41 and 42 is disposed inside inner circumferential surface 522*a* of bobbin main-body portion 522 to face inner circumferential surface 522*a* with a predetermined gap being interposed between the outer circumferential surface of the magnet and the movable-body cores and the inner circumferential surface of the bobbin main-body portion.

When movable body 20 moves in the vibration direction, movable body 20 reciprocates along inner circumferential surface 522*a* such that outer circumferential surface 20*a* does not make contact with inner circumferential surface 522*a*.

<Magnet 30>

Magnet 30 is magnetized in the vibration direction. Magnet 30 is formed in a disk shape in the present embodiment, and front and back surfaces 30*a* and 30*b* separate from each other in the vibration direction respectively have different poles. Front and back surfaces 30*a* and 30*b* of magnet 30 are two magnetized surfaces separate from each other in the extending direction of the axes of coils 61 and 62.

Magnet 30 is disposed so as to be spaced apart by a distance from coils 61 and 62 (to be described later in detail) inward of coils 61 and 62 in a radial direction. Here, the term "radially (radial direction)" means a direction orthogonal to the axes of coils 61 and 62, and also means the direction orthogonal to the vibration direction. This "gap" in the radial direction is a gap between magnet 30 and coils 61 and 62 including bobbin main-body portion 522, and is a gap allowing movable body 20 to move in the vibration direction of movable body 20 such that magnet 30 and coils 61 and 62 do not make contact with each other. That is, the "gap" means a predetermined gap between bobbin main-body portion 522 and magnet 30 in the present embodiment.

Magnet 30 is disposed to face, at the outside in the radial direction, the center of bobbin main-body portion 522 in the present embodiment. Note that, magnet 30 may have any other shape than the disk shape, such as a cylindrical shape, a plate-like shape, or the like as long as magnet 30 is disposed inside coils 61 and 62 such that the two magnetized surfaces face in the extending direction of the axes of coils 61 and 62. In addition, it is desirable that the center of magnet 30 in the axial direction coincide with the center of movable body 20 in the axial direction.

First and second yokes 41 and 42 are disposed respectively on front and back surfaces 30*a* and 30*b* of magnet 30.

<Pair of Yokes (First Yoke 41 and Second Yoke 42)>

First and second yokes 41 and 42 are made of magnetic material, function as yokes, and together with magnet 30 and coils 61 and 62, constitute a magnetic circuit. First and second yokes 41 and 42, together with magnet 30, constitute a movable-body-side magnetic circuit. First and second yokes 41 and 42 concentrate the magnetic flux of magnet 30 to allow efficient flow without leakage, and effectively distribute the magnetic flux flowing between magnet 30 and coils 61 and 62.

In addition to the function as a part of the magnetic circuit, first and second yokes 41 and 42 in movable body 20 have a function as a main body portion of movable body 20, a function of fixing tubular members 22 and 24, and a function as a weight. In addition, first and second yokes 41 and 42 have the function of directly bringing shaft members 26 and 28 into contact with magnet 30 in movable body 20.

In the present embodiment, first and second yokes 41 and 42 are formed in an annular flat plate shape having the same surface shape as magnet 30. First and second yokes 41 and 42 are fixed to magnet 30 such that the outer circumferential surfaces thereof have the same diameter as the outer circumference of the central surface of the outer circumferential surface of the magnet, and form outer circumferential surface 20*a* of movable body 20 together with the outer circumferential surface of the magnet.

First and second yokes 41 and 42 are the same similarly-formed members in the present embodiment, and are symmetrically disposed above and below magnet 30 so as to sandwich magnet 30. Note that, first and second yokes 41 and 42 are attracted to magnet 30, and also are fixed to magnet 30, for example, by a thermosetting adhesive such as an epoxy resin or an anaerobic adhesive.

Fitting openings 411 and 421, which are opening portions into which portions of the upper and lower pair of connecting parts 21 and 23 fit, are formed in central portions of first and second yokes 41 and 42, respectively. Within fitting openings 411 and 421, as part of the pair of connecting parts 21 and 23, pin main bodies 262 and 282 of upper and lower tubular members (sleeves) 22 and 24 and first and second shaft members 26 and 28 are positioned by insertion.

First and second yokes 41 and 42, at fitting openings 411 and 421, position the axes of connecting parts 21 and 23 (upper and lower tubular members 22 and 24 and shaft members 26 and 28) on the central axis of movable body 20 (the central axis of elastic supporting parts 81 and 82), supporting connecting parts 21 and 23. Fitting openings 411 and 421 allow for the adjustment of the degree of opening in first and second yokes 41 and 42, adjusting the weights of the yokes and connecting parts 21 and 23, thus adjusting the weight of movable body 20 itself, and setting an appropriate vibration output. Further, by forming holes at predetermined intervals in the circumferential direction in first and second yokes 41 and 42 such that the holes serve as weight adjustment portions, the weight of movable body 20 can be adjusted.

In the present embodiment, when movable body 20 is not vibrating, first and second yokes 41 and 42 are positioned on the inner side (radially inner side) of coils 61 and 62 so as to face the inner circumferential surfaces of coils 61 and 62, respectively, in a direction orthogonal to the axial direction of coils 61 and 62.

In first and second yokes 41 and 42, it is preferable that the height position of the upper surface of first yoke 41 on the upper side of magnet 30 face the position of the center of upper coil 61 in the height direction (upper-lower direction). In addition, it is preferable that the height position of the lower surface of second yoke 42 on the lower side of magnet 30 face the position of the center of lower coil 62 in the height direction (upper-lower direction).

<Pair of Connecting Parts 21 and 23 (Tubular Members 22 and 24 and Shaft Members 26 and 28)>

A pair of connecting parts 21 and 23 connect movable body 20 (specifically, movable stacked body 15) to elastic supporting parts 81 and 82. The pair of connecting parts 21 and 23 include tubular members 22 and 24 and shaft members 26 and 28, respectively. Connecting part 21 is connected to elastic supporting part 81 by tubular member 22 and first shaft member 26, and connecting part 23 is connected to elastic supporting part 82 by tubular member 24 and second shaft member 28. It is preferable that the pair of connecting parts 21 and 23 are formed from a metal formed by copper sintering or the like.

<Tubular Members 22, 24>

Tubular members 22 and 24 have a function of fixing movable stacked body 15 including the movable-body-side magnetic circuit to elastic supporting parts 81 and 82, and a function as a weight of movable body 20. Tubular members 22 and 24 are symmetrically disposed so as to sandwich magnet 30 and first and second yokes 41 and 42, and increase the vibration output of movable body 20.

Tubular members 22 and 24 are a tubular shaft-like body disposed along the central axis of movable body 20 in the present embodiment, and are interposed between first and second yokes 41 and 42 and elastic supporting parts 81 and 82.

Tubular members 22 and 24 include through-holes 226 and 246 that pass through them. Further, shaft members 26 and 28 are inserted into through-holes 226 and 246 of tubular members 22 and 24.

In this embodiment, tubular members 22 and 24 are formed in the same shape, and include insertion tubular portions 222 and 242 with the tip-end-side end surfaces of tubular members 22 and 24, and joining tubular portions (spring clamping tubular portions) 224 and 244. These insertion tubular portions 222 and 242 and joining tubular portions 224 and 244 are connected continuously in the vibration direction (specifically, the vertical direction).

Insertion tubular portions 222 and 242 include the tip end portions of tubular members 22 and 24 and are inserted into fitting openings 411 and 421. Insertion tubular portions 222 and 242 may correspond to the "tip end portions" of tubular members 22 and 24. Further, joining tubular portions 224 and 244 include the base end portions of tubular members 22 and 24, and may correspond to the "base end portions" of tubular members 22 and 24.

Insertion tubular portions 222 and 242 are joined respectively to first and second yokes 41 and 42. Specifically, insertion tubular portions 222 and 242 are, at the other end portion side, inserted in and fitted internally to fitting openings 411 and 421 in first and second yokes 41 and 42, respectively.

In this embodiment, tubular members 22 and 24 are fixed to first and second yokes 41 and 42 by press-fitting. Tubular members 22 and 24 may be fixed to first and second yokes 41 and 42 by adhesive using, for example, a thermosetting adhesive such as epoxy resin or an anaerobic adhesive, and a combination of press-fitting and adhesive may also be used.

Joining tubular portions 224 and 244 constitute the base end portions having the base-end-side end surfaces of tubular members 22 and 24, and have an outer diameter larger than that of insertion tubular portions 222 and 242. This allows for a larger contact area when inner circumferential portions 802 of elastic supporting parts 81 and 82 are clamped with flanges 264 and 284 (i.e., the areas of inner circumferential portions 802 clamped can be made larger). Thus, a strong joint is possible between connecting parts 21 and 23 and elastic supporting parts 81 and 82.

Upper joining tubular portion 224 forms one end portion of movable body 20 in the vibration direction, that is, the upper end portion of movable body 20. Inner circumferential portion 802, which is the end portion (other end portion) of the upper leaf spring on the inner diameter side that is elastic supporting part 81, is overlaid and joined to joining tubular portion 224. Joining tubular portion 224 is provided in tubular member 22 at the base end portion (upper portion in the figure) of insertion tubular portion 222 to face first and second yokes 41 and 42 with an axial separation. At its base-end-side end surface, the joining tubular portion is joined to inner circumferential portion 802 together with shaft member 26.

On the other hand, lower joining tubular portion 244 forms the other end portion of movable body 20 in the vibration direction, that is, the lower end portion of movable body 20. Inner circumferential portion 802, which is an inner-diameter-side end portion of the lower leaf spring as elastic supporting part 82 is joined to joining tubular portion 244 to be stacked thereon.

Joining tubular portion 244 is provided in tubular member 24 at the base end portion (lower portion in the figure) of insertion tubular portion 242 to face first and second yokes 41 and 42 with an axial separation. At its base-end-side end surface, the joining tubular portion is joined to inner circumferential portion 802 together with shaft member 28. Elastic supporting part 81 together with elastic supporting part 82 will be described later in detail.

<Pair of Shaft Members (First Shaft Member 26 and Second Shaft Member 28)>

First and second shaft members 26 and 28 firmly fix elastic supporting parts 81 and 82 and movable body 20 such that the elastic supporting parts do not come off due to the vibration of movable body 20.

First and second shaft members 26 and 28 penetrate tubular members 22 and 24 and contact magnet 30 at the center of movable body 20. First and second shaft members 26 and 28 fix elastic supporting parts 81 and 82 to movable body 20 together with tubular members 22 and 24 while maintaining the distance from elastic supporting parts 81 and 82 to magnet 30 at the center of movable body 20.

Figure 6:
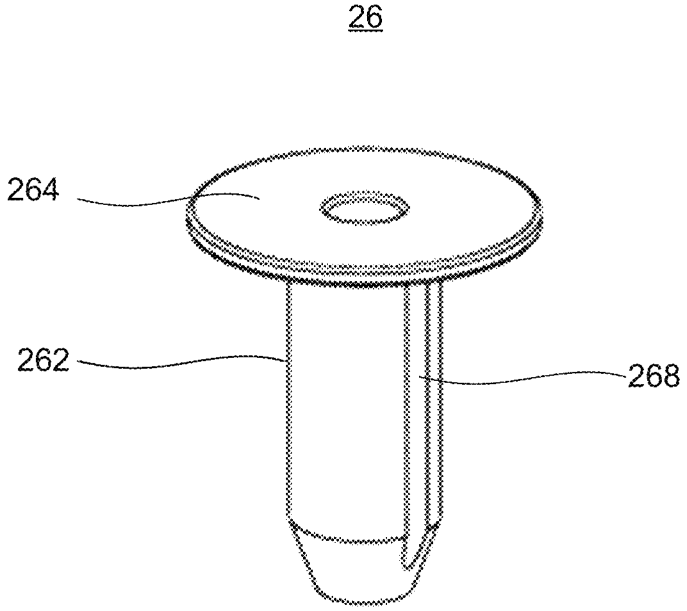
FIG. 6 is a planar-surface-side perspective view of a shaft member of the vibration actuator of the present embodiment.
Figure 7:
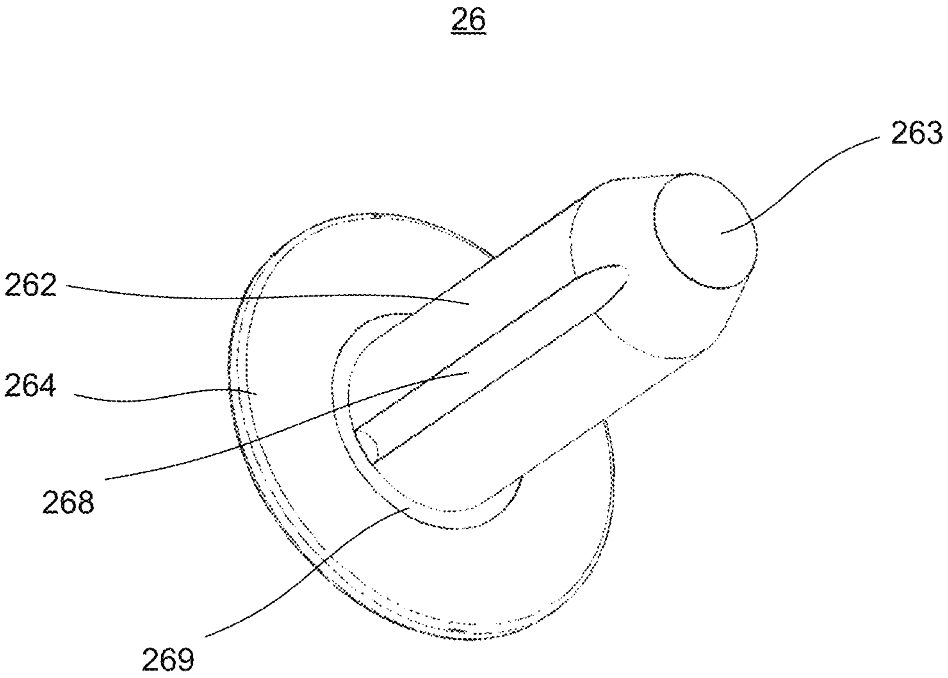
FIG. 7 is a bottom side perspective view of the shaft member of the vibration actuator of the present embodiment.

FIG. 6 is a planar-surface-side perspective view of the first shaft member of the vibration actuator according to the present embodiment, and FIG. 7 is a bottom side perspective view of the same first shaft member. Since second shaft member 28 is formed similarly to the first spring, second shaft member 28 will be described together with the description of first shaft member 26 shown in FIGS. 6 and 7.

First and second shaft members 26 and 28 are symmetrically arranged in the vibration direction with magnet 30 in between. First and second shaft members 26 and 28 are formed, for example, of a metal formed by copper sintering or the like. Moreover, first and second shaft members 26 and 28 may be formed of any material such as resin, in addition to metal, as long as they can fix elastic supporting parts 81 and 82 to tubular members 22 and 24. First and second shaft members 26 and 28 are, for example, rivets that are press-fitted and fixed to tubular members 22 and 24, and when they are rivets made by copper sintering, they can be firmly joined when tubular members 22 and 24 are made of the same material.

First and second shaft members 26 and 28 respectively include shaft-like pin main bodies (shaft members) 262 and 282 with tip ends 263 and 283, and flanges 264 and 284 provided protruding radially outward at the base end portions of pin main bodies 262 and 282.

Pin main bodies 262 and 282 are inserted and fixed into through-holes 226 and 246 (through-holes of tubular members 22 and 24) of joining tubular portions 224 and 244, respectively, in the state of extending through inner circumferential portions 802 overlaid and placed on joining tubular portions 224 and 244. Pin main bodies 262 and 282 may be fixed to tubular members 22 and 24 in any manner. Pin main bodies 262 and 282 are press-fitted and fixed to tubular members 22 and 24. Note that pin main bodies 262 and 282 constitute the "shaft members".

Pin main bodies 262 and 282, together with flanges 264 and 284, constitute the length from magnet 30 to flanges 264 and 284, that is, to the opposite ends of movable body 20. Tip ends 263 and 283 of pin main bodies 262 and 282 are in contact with front and back surfaces 30*a* and 30*b* of magnet 30.

In other words, pin body 262 includes the length of tubular member 22 plus the thickness of elastic supporting part 81, and pin body 282 includes the length of tubular member 24 plus the thickness of elastic supporting part 82.

Flanges 264 and 284 are positioned above and below inner circumferential portions 802 of elastic supporting parts 81 and 82, which are located above and below joining tubular portions 224 and 244.

Flanges 264 and 284 are included in the base end portions of first and second shaft members 26 and 28, and sandwich the pair of elastic supporting parts 81 and 82 with the base-end-side end surfaces of tubular members 22 and 24, connecting movable stacked body 15 to the pair of elastic supporting parts 81 and 82, respectively.

Slits 268 and 288 are formed in the outer circumferential surfaces of pin main bodies 262 and 282, extending to the tip ends along the axial direction. Slits 268 and 288 are formed in a groove shape in the outer circumferential surfaces of pin main bodies 262 and 282, extending from the tip end to the base end.

Slits 268 and 288 allow air within through-holes 226 and 246 to be expelled (drawn out) to the outside when pin main bodies 262 and 282 are pressed into through-holes 226 and 246 of joining tubular portions 224 and 244. Further, annular grooves 269 are formed respectively in the back surfaces of flanges 264 and 284 so as to surround pin main bodies 262 and 282. Annular grooves 269 communicate with slits 268 and 288.

Flanges 264 and 284, together with joining tubular portions 224 and 244, clamp inner circumferential portions 802 of elastic supporting parts 81 and 82, thereby firmly attaching elastic supporting parts 81 and 82 to movable body 20.

Further, inner circumferential portions 802 of elastic supporting parts 81 and 82 and at least one of joining tubular portions 224 and 244 and flanges 264 and 284 may be joined by welding, adhesion, etc., and may also be joined by a combination of welding, adhesion, or caulking. Grooves are formed in portions of joining tubular portions 224 and 244 that face inner circumferential portions 802, where the material used for welding or adhesion is stored, and are designed to firmly join joining tubular portions 224 and 244 themselves to inner circumferential surfaces 802.

Note that, while tubular members 22 and 24 may be formed from a magnetic material, it is desirable that tubular members 22 and 24 be formed from a non-magnetic material. When tubular members 22 and 24 are formed from a non-magnetic material, the magnetic flux from first yoke 41 does not flow upward, and the magnetic flux from second yoke 42 does not flow downward, and the magnetic fluxes can thus efficiently flow toward coils 61 and 62 located on the outer circumferential side of first and second yokes 41 and 42.

Figure 8:
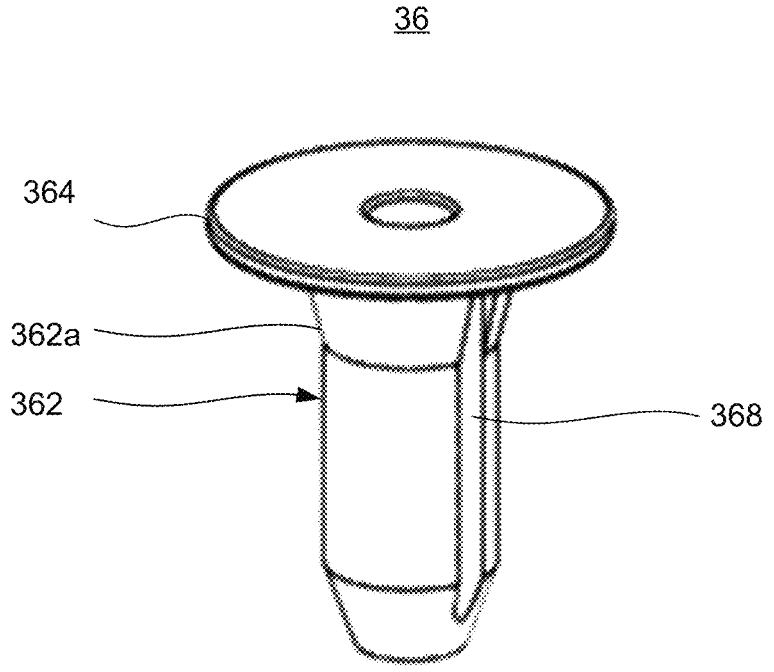
FIG. 8 is a perspective view showing Variation 1 of the shaft member.

FIG. 8 is a perspective view showing Variation 1 of the shaft member. Tubular member 36 as Variation 1 shown in FIG. 8 has, similarly to first and second shaft members 26 and 28, shaft-shaped pin main body 362, flange 364 protruding radially outward at the base end portion of pin main body 362, and slit 368. Slit 368 has a function similar to that of slit 268.

Pin main body 362 is flexible and is formed in a deformable manner, and includes frustum portion 362*a* that deforms and fits inside when inserted into through-holes 226 and 246 of tubular members 22 and 24.

Frustum portion 362*a* is formed at the base end portion so that its outer diameter gradually increases from the tip end side towards the base end side. Tubular member 36 is formed entirely by a member having flexibility such as resin, and when pin main body 362 is inserted into through-holes 226 and 246 of tubular members 22 and 24, frustum portion 362*a* deforms and fits within through-holes 226 and 246. Thus, tubular member 36 can more firmly fix elastic supporting parts 81 and 82 to movable body 20 in vibration actuator 1, instead of first and second shaft members 26 and 28.

<Fixing Body 50>

Fixing body 50 holds coils 61 and 62, and supports, via elastic supporting parts 81 and 82, movable body 20 inside coils 61 and 62 in the radial direction such that movable body 20 is freely movable in the vibration direction (the coil-axis direction, the axial direction of movable body 20).

Fixing body 50 includes case 10, coils 61 and 62, coil bobbin part 52, and outer yoke 58.

Figure 9:
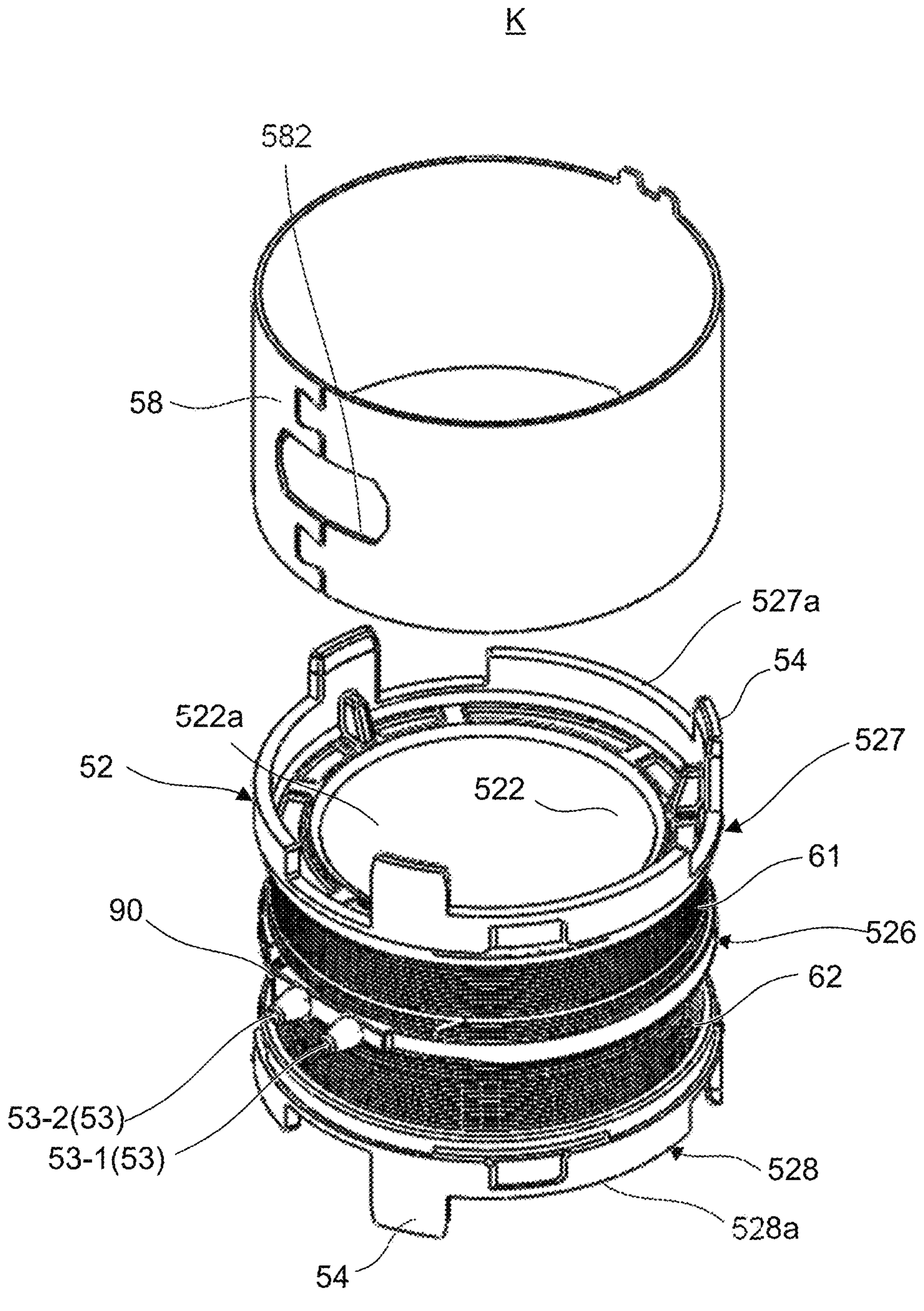
FIG. 9 is a view showing a coil assembly with an outer yoke removed.

FIG. 9 is a diagram showing coil assembly K with outer yoke 58 removed.

Coil assembly K is composed of coils 61 and 62 and coil bobbin part 52. In the present embodiment, vibration actuator 1 is configured by connecting, to coil assembly K, substantially all components for generating vibrations such as movable body 20 and case 10 via elastic supporting parts 81 and 82.

Coil bobbin part 52 holds coils 61 and 62 wound on the outer circumferential surface the coil bobbin part, surrounds magnet 30 by inner circumferential surface 522*a*, and guides the movement of movable body 20 including magnet 30.

Coil bobbin part 52 is a cylindrical body formed from a resin such as a phenolic resin, poly butylene terephthalate (PBT), or the like. In the present embodiment, coil bobbin part 52 is formed from a material containing a phenolic resin such as Bakelite having high flame retardancy.

When coil bobbin part 52 is formed from a material containing a phenolic resin, a higher flame retardancy is obtained, so that it is possible to improve the safety at the time of driving even when heat is generated by Joule heat when a current flows through coils 61 and 62 held by coil bobbin part 52. Moreover, the dimensional accuracy is increased and the positional accuracy of coils 61 and 62 is increased accordingly. It is thus possible to reduce variations in vibration characteristics.

Coil bobbin part 52 includes cylindrical bobbin main-body portion 522, middle flange portion 526 and flange portions 527 and 528 protruding from the outer circumference of bobbin main-body portion 522 in the radial direction, terminal tying parts (coil connection parts) 53, and movable-range forming parts 54.

Coils 61 and 62 are wound around coil bobbin part 52. Coils 61 and 62 are covered by outer yoke 58. Note that, terminal tying parts (coil connection parts) 53 may also be illustrated and described as terminal tying parts (coil connection parts) 53-1 and 53-2, for convenience.

Bobbin main-body portion 522 functions as a protective wall portion for protecting coils 61 and 62 against collision by movable body 20 when movable body 20 disposed inside is being driven. The thickness of bobbin main-body portion

522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of bobbin main-body portion 522 side by side in the coil axial direction between middle flange portion 526 and flange portions 527 and 528 (coil attachment portions 52*b* and 52*c*). Coils 61 and 62 are arranged in the coil axis direction so as to surround the outer circumferential surfaces of first and second yokes 41 and 42 of movable body 20 (the outer circumferential surfaces of magnet 30 and first and second yokes 41 and 42).

Specifically, recessed coil attachment portions 52*b* and 52*c* that are demarcated by middle flange portion 526 and flange portions 527 and 528 and that open radially outward on the outer circumferential side are disposed on and in the outer circumferential surface of bobbin main-body portion 522.

Terminal tying parts 53 function as a connector connection portion to which the coil winding of coils 61 and 62 is tied for connection to an external device as illustrated in FIG. 9. Coils 61 and 62 are connected to the external device via terminal tying parts 53 and power is supplied to coils 61 and 62.

Terminal tying parts 53 are electrically conductive members disposed to protrude from the outer circumferential portion of bobbin main-body portion 522. In the present embodiment, terminal tying parts 53 are press-fitted to the outer circumferential surface of middle flange portion 526 disposed on the outer circumference of coil bobbin main-body portion 522 centrally in the vibration direction. Terminal tying parts 53 are thus disposed to protrude from the outer circumferential surface of middle flange portion 526.

Flange portions 527 and 528 are disposed respectively on opposite end portions of bobbin main-body portion 522 which are separate from each other in the axial direction of the bobbin main-body portion (which is also the vibration direction and the upper-lower direction in the present embodiment), so as to form the upper and lower end portions of coil bobbin part 52.

Elastic supporting parts 81 and 82 are fixed to end portions of flange portions 527 and 528 on the sides away from middle flange portion 526 (upper and lower end portions in the present embodiment).

Movable-range forming parts 54 are disposed on the upper and lower end portions of coil bobbin part 52, and form a vibration range between lid portion 12 and bottom portion 114 of case 10 and movable body 20 when coil bobbin part 52 is accommodated in case 10.

Movable-range forming parts 54 are protruding side portions that are formed to protrude from each of flange portions 527 and 528 in the vibration direction (upper-lower direction). Movable-range forming parts 54 are disposed at predetermined intervals on upper and lower annular opening end surfaces (also referred to as "upper end surface and lower end surface" respectively) 527*a* and 528*a* of flange portions 527 and 528. Annular upper end surface 527*a* is an opening end surface on one side, and lower end surface 528*a* is an opening end surface on the other side.

Flange portion 527 includes, at one opening end surface, movable-range forming parts 54 in the form of projections protruding in the vibration direction. The one opening end surface functions as a top surface receiving portion for receiving lid portion 12 via movable-range forming parts 54. Flange portion 528 includes, at the other opening end surface, movable-range forming parts 54 in the form of projections protruding in the vibration direction. The other opening end surface functions as a bottom receiving portion for receiving bottom portion 114 through movable-range forming parts 54.

Further, movable-range forming parts 54 are fitted into positioning grooves 808 formed in elastic supporting parts 81 and 82 as illustrated in FIGS. 1 to 3, to perform radial positioning of elastic supporting parts 81 and 82. Each of movable-range forming parts 54 (see FIGS. 1 and 9) as seen in the axial direction is formed in an arc shape that has a predetermined thickness in the radial direction and a length longer in the circumferential direction than in the radial direction. Positioning grooves 808 are formed correspondingly to the shape of movable-range forming parts 54.

In the present embodiment, movable-range forming parts 54 are fitted into positioning grooves 808, so as to position elastic supporting parts 81 and 82 with respect to coil bobbin part 52 while restricting the radial and circumferential movement of elastic supporting parts 81 and 82.

Movable-range forming parts 54 are fitted in positioning grooves 808. Accordingly, it is possible to uniformly set the attachment positions of elastic supporting parts 81 and 82 with respect to coil bobbin part 52 of each individual driving unit 13, so as to perform stable position determination of elastic supporting parts 81 and 82 with respect to coil bobbin part 52.

Thus, elastic supporting parts 81 and 82 are not fixed to the fixing body side via a plurality of components. Thus, a structure less susceptible to component tolerances is achieved, and movement in the circumferential direction and the radial direction such as rotation is restricted. It is thus possible to suppress variations in elastic supporting parts 81 and 82 in products, and to achieve stable characteristics.

Movable-range forming parts 54 are disposed at equal intervals about the axis of coil bobbin part 52. Movable-range forming parts 54 are disposed at three positions at equal intervals around the axis of coil bobbin part 52 in the present embodiment. However, any number of movable-range forming parts may be disposed as long as the movable-range forming parts can position elastic supporting parts 81 and 82.

Further, each of elastic supporting parts 81 and 82 is supported by three movable-range forming parts 54 via positioning grooves 808. This reduces snagging and friction during the insertion of movable body 20 into coil bobbin part 52, improves assembly, and facilitates positioning of movable body 20 and coil bobbin part 52.

Coil bobbin part 52 is accommodated in case 10 such that movable-range forming parts 54 at the upper and lower end surfaces are in contact with the edge portion of lid portion 12 and the edge portion of bottom portion 114, and is fixed to the edge portion of lid portion 12 and the edge portion of bottom portion 114.

Flange portions 527 and 528 include positioning engagement portions 529 (see FIG. 2) for position determination of the outer yoke, which are engaged with outer yoke 58. Positioning engagement portions 529 are disposed in the outer circumferential portions of flange portions 527 and 528, i.e., in outer diameter portions of coil bobbin part 52. The positioning engagement portions cause outer yoke 58 to be positioned at a position surrounding coils 61 and 62.

Positioning engagement portions 529 are engaged with engaged portions 589 of outer yoke 58. Positioning engagement portions 529 are recessed grooves that open toward middle flange portion 526 in the outer circumferential portions of respective flange portions 527 and 528, and are engaged with protruding engaged portions 589 in the present embodiment.

The engagement between such positioning engagement portions 529 and engaged portions 589 makes it possible to dispose outer yoke 58 without any shift with respect to coils 61 and 62 wound around coil bobbin part 52, so as to achieve stable magnetic properties.

Note that, an adhesion portion may be disposed on the outer circumferential surfaces of middle flange portion 526 and flange portions 527 and 528 having the same outer diameter, and outer yoke 58 may be adhered to middle flange portion 526 and flange portions 527 and 528 via the adhesion portion. This can achieve more stable vibration characteristics.

<Coil>

In vibration actuator 1, coils 61 and 62, together with magnet 30 and first and second yokes 41 and 42, are used for generating a drive source of vibration actuator 1, in which case the axial direction of coils 61 and 62 (magnetization direction of magnet 30) is the vibration direction. Coils 61 and 62 are energized during driving (during vibration), and, together with magnet 30, form a voice coil motor.

Coils 61 and 62 are disposed on coil attachment portions 52*b* and 52*c*, and coils 61 and 62 are disposed at positions facing first and second yokes 41 and 42 in a direction orthogonal to the vibration direction in the present embodiment.

Coils 61 and 62 are held by coil bobbin part 52 such that the center position of the length of the coils and the coil bobbin part in the coil-axis direction (vibration direction) is substantially the same position (including the same position) in the vibration direction as the center position of the length of movable body 20 in the vibration direction (the center position of magnet 30 in the vibration direction). Coils 61 and 62 of the present embodiment are wound in opposite directions to each other, and are configured such that a current flows in the opposite direction during energization.

The end portions of coils 61 and 62 are tied and connected to terminal tying parts 53 of middle flange portion 526. Coils 61 and 62 are connected via terminal tying parts 53 to the power supplying part (e.g., drive control part 203 illustrated in FIGS. 14 and 15). For example, the end portions of coils 61 and 62 are connected to an alternating-current supplying part, and coils 61 and 62 are supplied with alternating-power (AC) power (AC voltage) from the alternating-current supplying part. Thus, coils 61 and 62 can generate, between the magnet and coils 61 and 62, thrust allowing movement in a direction toward each other or away from each other in their axial direction.

It is preferable that the coil axes of coils 61 and 62 be disposed coaxially with the axis of coil bobbin part 52 or the axis of magnet 30.

Coils 61 and 62 are formed in a cylindrical shape by winding a coil wire on coil attachment portions 52*b* and 52*c* from the outside of coil bobbin part 52. With this configuration, coil bobbin part 52 including coils 61 and 62 maintains the cylindrical bodies of coils 61 and 62, and can thus be assembled without using a self-bonding wire for the coils. In other words, since it is not necessary to use an air-core coil as the coils, it is possible to reduce the cost of coils 61 and 62 itself and, thus, the cost of the entire vibration actuator.

Further, coils 61 and 62 are, at the outer circumferential surface, surrounded by outer yoke 58 inside case 10, sealed by the coil attachment portions, and fixed by adhesion or the like within the coil attachment portions. In the present embodiment, coils 61 and 62 are fixed by adhesion to all of bobbin main-body portion 522, middle flange portion 526, and flange portions 527 and 528. It is thus possible to increase the bonding strength between coils 61 and 62 and coil bobbin part 52, so that even when a large impact is applied to coils 61 and 62, coils 61 and 62 are less damaged than in a configuration in which a movable body makes direct contact with a coil.

Outer yoke 58 is a tubular magnetic material that surrounds the outer circumferential surface of coil bobbin part 52 and is disposed at a position that covers coils 61 and 62 radially outward. Outer yoke 58 is positioned with respect to coil bobbin part 52 via terminal bringing-out portion 90 and positioning engagement portion 529 of coil bobbin part 52. Terminal bringing-out portion 90 is fitted into opening portion 582 in outer yoke 58 in the present embodiment. Thus, terminal bringing-out portion 90 functions as a stop against rotation of outer yoke 58. Outer yoke 58, together with coils 61 and 62, constitutes a fixing-body-side magnetic circuit, and prevents, in the movable-body-side magnetic circuit, i.e., the magnetic circuit constituted by magnet 30 and first and second yokes 41 and 42, leakage magnetic flux to the outside of vibration actuator 1.

Outer yoke 58 is disposed such that the center of the length of outer yoke 58 in the vibration direction is located at the same height as the center of magnet 30 in the vibration direction that is disposed inside outer yoke 58. The shielding effect of outer yoke 58 makes it possible to reduce the leakage magnetic flux to the outside of the vibration actuator.

Outer yoke 58 also makes it possible to increase the thrust constant so as to increase the electromagnetic conversion efficiency in the magnetic circuit. Outer yoke 58 utilizes the magnetic attraction force of magnet 30, and functions as a magnetic spring together with magnet 30. The magnetic spring makes it possible to reduce a stress that would be caused when elastic supporting parts 81 and 82 are mechanical springs, so as to improve the durability of elastic supporting parts 81 and 82.

<Elastic Supporting Parts 81 and 82>

Elastic supporting parts 81 and 82 support movable body 20 such that the movable body freely reciprocates in the vibration direction with respect to fixing body 50.

Elastic supporting parts 81 and 82 sandwich movable body 20 in the vibration direction of movable body 20 and are disposed on both movable body 20 and fixing body 50 to intersect the vibration direction. In the present embodiment, elastic supporting parts 81 and 82 are disposed to be away from each other respectively on the opposite end portions (upper and lower end portions) of movable body 20 which are separate from each other in the vibration direction, and are connected to fixing body 50 at the radially outer side of movable body 20 as illustrated in FIGS. 2 to 4. In the present embodiment, elastic supporting parts 81 and 82 are disposed to extend in the direction orthogonal to the vibration direction and to face each other.

In elastic supporting parts 81 and 82, inner circumferential portions 802 are joined to the opposite end portions (joining tubular portions 224 and 244) which are separated in the axial direction (vibration direction) of movable body 20 and located on the axis of the movable body.

Further, outer circumferential fixing portion 806 side is attached to movable body 20 to protrude radially outward (in the radial direction).

Elastic supporting parts 81 and 82 are a pair of elastic supporting parts for supporting movable body 20 such that movable body 20 is capable of reciprocating vibration in the vibration direction along the axial direction of magnet 30. Each of elastic supporting parts 81 and 82 is joined to fixing body 50 at an outer circumferential fixing portion (outer circumferential portion), and is joined to tubular member 22 or 24 at inner circumferential portion 802.

Elastic supporting parts 81 and 82 are configured to move movable body 20 in the vibration direction, and support movable body 20 such that movable body 20 does not make contact with fixing body 50 in the non-driven state and the driven state of movable body 20. Note that, during driving (vibration) of movable body 20, even when elastic supporting parts 81 and 82 makes contact with inner circumferential surface 522*a* of bobbin main-body portion 522 of movable body 20, the magnetic circuit (specifically, coils 61 and 62) is not damaged. Elastic supporting parts 81 and 82 may be formed from any material as long as they are configured to elastically support movable body 20 movably. Elastic supporting parts 81 and 82 are the same members having the same configuration in the present embodiment.

Elastic supporting parts 81 and 82 may be non-magnetic materials or magnetic materials (specifically, ferromagnetic materials). Elastic supporting parts 81 and 82 may be formed from a stainless-steel plate such as SUS304, SUS316 as long as they are non-magnetic leaf springs. Further, when elastic supporting parts 81 and 82 are a magnetic material, a stainless steel plate such as SUS301 can be applied. As a material of elastic supporting parts 81 and 82, for example, a magnetic material (for example, SUS301) is known to be more durable and inexpensive than a non-magnetic material (for example, SUS304, SUS316, or the like). In the present embodiment, elastic supporting parts 81 and 82 are formed of SUS301.

Elastic supporting parts 81 and 82 are a plurality of flat plate-like leaf springs. For movable body 20, the plurality of elastic supporting parts 81 and 82 may be three or more leaf springs. The plurality of leaf springs are attached to extend along the direction orthogonal to the vibration direction.

Each of elastic supporting parts 81 and 82 that are leaf springs has such a shape that annular inner circumferential portion 802, which is a spring end portion situated on the inner side, and outer circumferential fixing portion 806, which is a spring end portion situated on the outer side, are joined to each other via deformation arm portions 804 that are elastically deformed and have an arc shape in plan view. In each of elastic supporting parts 81 and 82, deformation of deformation arm portions 804 causes inner circumferential portion 802 to be displaced with respect to outer circumferential fixing portion 806 in the axial direction.

The leaf springs being elastic supporting parts 81 and 82 are formed by sheet metal processing using a stainless steel plate, and more specifically, are thin flat disk-shaped spiral springs in the present embodiment. Since elastic supporting parts 81 and 82 are flat plate-like, it is possible to improve the positional accuracy, that is, to improve the processing accuracy as compared with a conical spring.

In the plurality of elastic supporting parts 81 and 82 illustrated in FIGS. 3 to 5, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 in the present embodiment such that the directions of the spirals of elastic supporting parts 81 and 82 are the same.

Since elastic supporting part 82 has the same configuration as elastic supporting part 81, elastic supporting part 81 will be described in detail, and the description of elastic supporting part 82 will be omitted.

Inner circumferential portion 802 is formed in an annular shape. Cutout portion 803 is formed in a portion of the outer circumferential edge of inner circumferential portion 802. Cutout portion 803 stores the adhesive when bonding inner circumferential portion 802 to either or both of joining tubular portions 224 and 244 and flanges 264 and 284. The stored adhesive solidifies in a state of being spread by capillary action between inner circumferential portions 802 and joining tubular portions 224 and 244 and flanges 264 and 284. As a result, inner circumferential portions 802 are firmly joined to either or both of joining tubular portions 224 and 244 and flanges 264 and 284.

Each of deformation arm portions 804 is elastically deformable, and is disposed between outer circumferential fixing portion 806 and inner circumferential portion 802. Deformation arm portion 804 is coupled at one end portion to outer circumferential fixing portion 806, and is coupled at the other end portion to inner circumferential portion 802. Deformation arm portion 804 couples together outer circumferential fixing portion 806 and inner circumferential portion 802.

In the present embodiment, a plurality of deformation arm portions 804 are disposed in a spiral shape at the outer circumference of inner circumferential portion 802 to be equally spaced apart from one another. Deformation arm portions 804 are disposed to extend spirally along the outer circumference of inner circumferential portion 802 to face the outer circumference of inner circumferential portion 802 in the radial direction with a gap being interposed in between.

Three deformation arm portions 804 are disposed between outer circumferential fixing portion 806 and inner circumferential portion 802 in the present embodiment to connect outer circumferential fixing portion 806 to inner circumferential portion 802. However, the present invention is not limited thereto, and a single deformation arm portion formed in a spiral shape may be used. When the spiral directions of the plurality of leaf springs are opposite each other, the plurality of leaf springs move in a buckling direction or a pulling direction to each other, whereby smooth movement is prevented.

Elastic supporting parts 81 and 82 of the present embodiment are fixed to movable body 20 such that the spiral directions are the same. Thus, even when the movement amount of movable body 20 increases, elastic supporting parts 81 and 82 can move smoothly, i.e., can be deformed to produce a greater amplitude, so that the vibration output can be increased.

However, depending on a desired vibration range of movable body 20, the spiral directions of the plurality of elastic supporting parts 81 and 82 may be designed to be opposite directions to each other.

Plate-like elastic supporting parts 81 and 82 are disposed on movable body 20 such that inner circumferential portions 802 of elastic supporting parts 81 and 82 are stacked respectively on joining tubular portions 224 and 244 forming the end portions of movable body 20 in the vibration direction. Inner circumferential portions 802 of elastic supporting parts 81 and 82 are fixedly sandwiched between flanges 264 and 284 of shaft members 26 and 28 and joining tubular portions 224 and 244 as described above.

Meanwhile, outer circumferential fixing portion 806 of upper elastic supporting part 81 is, at the outside in the radial direction, fixed to the upper end portion of coil bobbin part 52. Specifically, outer circumferential fixing portion 806 of elastic supporting part 81 is fixed to a portion of annular upper end surface 527*a* of upper flange portion 527 forming the upper end portion of coil bobbin part 52, the portion being other than movable-range forming parts 54.

Outer circumferential fixing portion 806 of elastic supporting part 81 is clamped and fixed by annular upper end surface 527*a* of flange portion 527 and pressing portion 128 of lid portion 12 within case 10. Note that, upper end surface 527*a* means an upper (one-side) end surface of the portion of the upper side (one side) of upper (one-side) flange portion 527 other than movable-range forming portions 54.

Further, outer circumferential fixing portion 806 of lower elastic supporting part 82 is fixed to the lower end portion of coil bobbin part 52 at the outside of movable body 20 in the radial direction in vibration actuator 1. Specifically, outer circumferential fixing portion 806 of elastic supporting part 82 is fixed to a portion of annular lower end surface 528*a* of lower flange portion 528 forming the lower end portion of coil bobbin part 52, the portion being other than movable-range forming parts 54.

Outer circumferential fixing portion 806 of elastic supporting part 82 is clamped and fixed by annular lower end surface 528*a* of flange portion 528 and step portion 118 formed on a circumferential edge portion of bottom portion 114 within case 10. Note that, lower end surface 528*a* means an upper (other-side) end surface of the portion of the lower side (other side) of lower (other-side) flange portion 528 other than movable-range forming portions 54.

As illustrated in FIG. 3, outer circumferential fixing portion 806 includes outermost circumferential portion 806*a* and inner bulging portion 806*b* bulging inward from outermost circumferential portion 806*a* in elastic supporting part 81 (the same applies to elastic supporting part 82).

Outermost circumferential portion 806*a* is clamped and fixed by upper or lower end surface 527*a* or 528*a* and pressing portion 128 or step portion 118.

Inner bulging portion 806*b* is a portion of outer circumferential fixing portion 806 to which damping part 72 is attached.

<Damping Part 72>

Damping parts (dampers) 72 are attached to elastic supporting parts 81 and 82 to effectively damp a vibration generated in elastic supporting parts 81 and 82.

Damping parts 72 are attached to elastic supporting parts 81 and 82 such that the damping parts do not come off elastic supporting parts 81 and 82.

Damping parts 72 damp a sharp spring resonance in elastic supporting part 81 (82), so as to prevent a significant increase in vibrations at frequencies close to the resonance frequency and, thus, to prevent a greater difference in vibration from being caused between frequencies. Thus, movable body 20 suppresses the resonance peak before plastic deformation, and can thus generate stable vibration over a wide range without making contact with lid portion 12 and bottom portion 114 and prevent abnormal noise due to contact. Damping parts 72 may be formed into any shape or from any material as long as they prevent the occurrence of sharp vibrations in elastic supporting part 81 (82). Damping parts 72 may be made of, for example, an elastomer, and may be made of a thermosetting resin or a material such as an adhesive having such a viscosity as to harden due to a change over time. When damping parts 72 are made of an adhesive, an adhesive or the like having a thixotropic property allowing the adhesive to have a low viscosity during stirring and to have a high viscosity during normal time may be used.

Damping parts 72 are disposed across an outermost-circumferential-side portion of a plurality of deformation arm portions 804 facing one another in the radial direction and outer circumferential fixing portion 806.

Damping parts 72 are bonded by adhesive, etc., to the side surfaces of outer circumferential fixing portion 806 and deformation arm portions 804, and are also bonded by adhesive, etc., on at least one side of the front and back surfaces, which are the upper and lower surfaces of outer circumferential fixing portion 806 and the front and back surfaces of deformation arm portions 804.

Note that, damping parts 72 are disposed at portions of elastic supporting parts 81 and 82 which are close to the fixing body 50 side, and where the assembly dimensions are steady. As is understood, damping parts 72 themselves do not significantly move. Damping parts 72 are in a state where the risk of detachment of damping parts 72 from elastic supporting parts 81 and 82 during driving is suppressed. It is unlikely for damping parts 72 to suffer from a positional deviation with respect to elastic supporting parts 81 and 82. It is thus possible to prevent variations in vibration damping. Further, damping parts 72 are prevented from coming off elastic supporting parts 81 and 82, and make it possible to suppress a change in the initial vibration characteristics.

Damping parts 72 are disposed at portions of each of elastic supporting parts 81 and 82 which are structurally the most stable in terms of shape and position. It is thus possible to achieve stability of the characteristics of vibration damping of movable body 20 to increase the reliability of the driving of vibration actuator 1.

<Case 10>

Case 10 includes: bottomed cylindrical case main body 11 having circumferential wall portion 112 and bottom portion 114; and lid portion 12 for closing opening portion 115 of case main body 11 as illustrated in FIGS. 1 and 2. Note that, case 10 is a column having a height (range of motion of movable body 20) allowing movable body 20 to reciprocate in the vibration direction by cooperation between the movable body and coils 61 and 62 disposed in case 10, so as to generate a sufficient thrust. For example, case 10 of the present embodiment is formed in a cylindrical shape by bottomed cylindrical case main body 11 and lid portion 12. However, the case is not limited to this shape. The case may be elliptical cylindrical or polygonal prismatic. The length of the case in the vibration direction is longer or shorter than the length of the case in a direction perpendicular to the vibration direction. The ellipse of the elliptical cylindrical shape and elliptical shape in the present embodiment is mainly an ellipse including parallel straight line portions, and means an oval shape. The ellipse may be an elongated circle. Further, case 10 is made of a non-magnetic material such as resin, and is molded from a resin such as polybutylene terephthalate (PBT).

As shown in FIGS. 1 to 3, lid portion 12 and bottom portion 114 are arranged to face movable body 20 of drive unit 13 at a predetermined interval in the vibration direction of movable body 20, and are joined to form a hollow cylindrical body.

Lid portion 12 has hanging portion 124 disposed to hang from a part of the outer circumference of top surface portion 122, and hanging portion 124 engages with cutout portion 102 of case main body 11, positioning and joining together lid portion 12 and case main body 11.

Lid portion 12 and bottom portion 114 reduce the movable range of movable body 20. Lid portion 12 and bottom portion 114 function as a movable-range reducing part that serves as a hard stop (movable range limitation) of movable body 20.

S Specifically, lid portion 12 and bottom portion 114 regulate the movable range formed by movable-range forming parts 54. That is, lid portion 12 and bottom portion 114 regulate the lengths from lid portion 12 and bottom portion 114 to the edge portions of the upper and lower end portions of driving unit 13 (coil bobbin part 52) (upper and lower end surfaces 527*a* and 528*a* of annular upper and lower flange portions 527 and 528). Thus, the hollow in case 10 forms a movable-body space, which is a space in which movable body 20 moves.

Thus, the movable-body space is defined as the length of the range in which elastic supporting parts 81 and 82 do not plastically deform. Therefore, even when a force causing movable body 20 to move beyond the movable range of movable body 20 is applied to movable body 20, elastic supporting parts 81 and 82 make contact with fixing body 50 (with at least one of lid portion 12 and bottom portion 114) without being plastically deformed. Thus, elastic supporting parts 81 and 82 are not damaged. It is thus possible to increase the reliability of vibration actuator 1.

Further, vent holes 126 and 116 are formed to extend through lid portion 12 and bottom portion 114, respectively. Vent holes 126 and 116 release, to the outside, compressed air formed in case 10 by the reciprocating vibration of movable body 20.

<Operation of Vibration Actuator 1>

Figure 10:
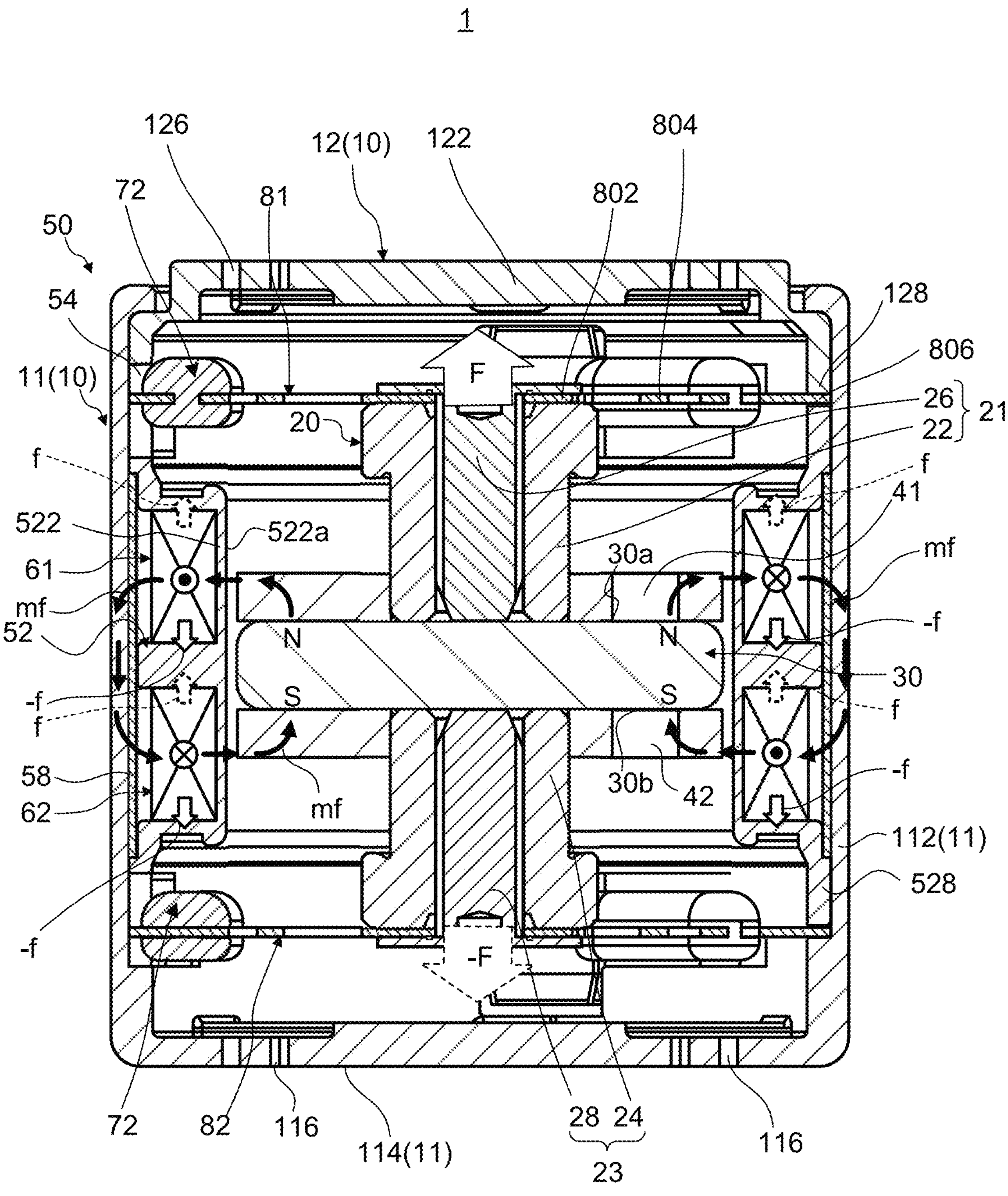
FIG. 10 is a schematic view showing a magnetic circuit configuration of the vibration actuator.
Figure 11:
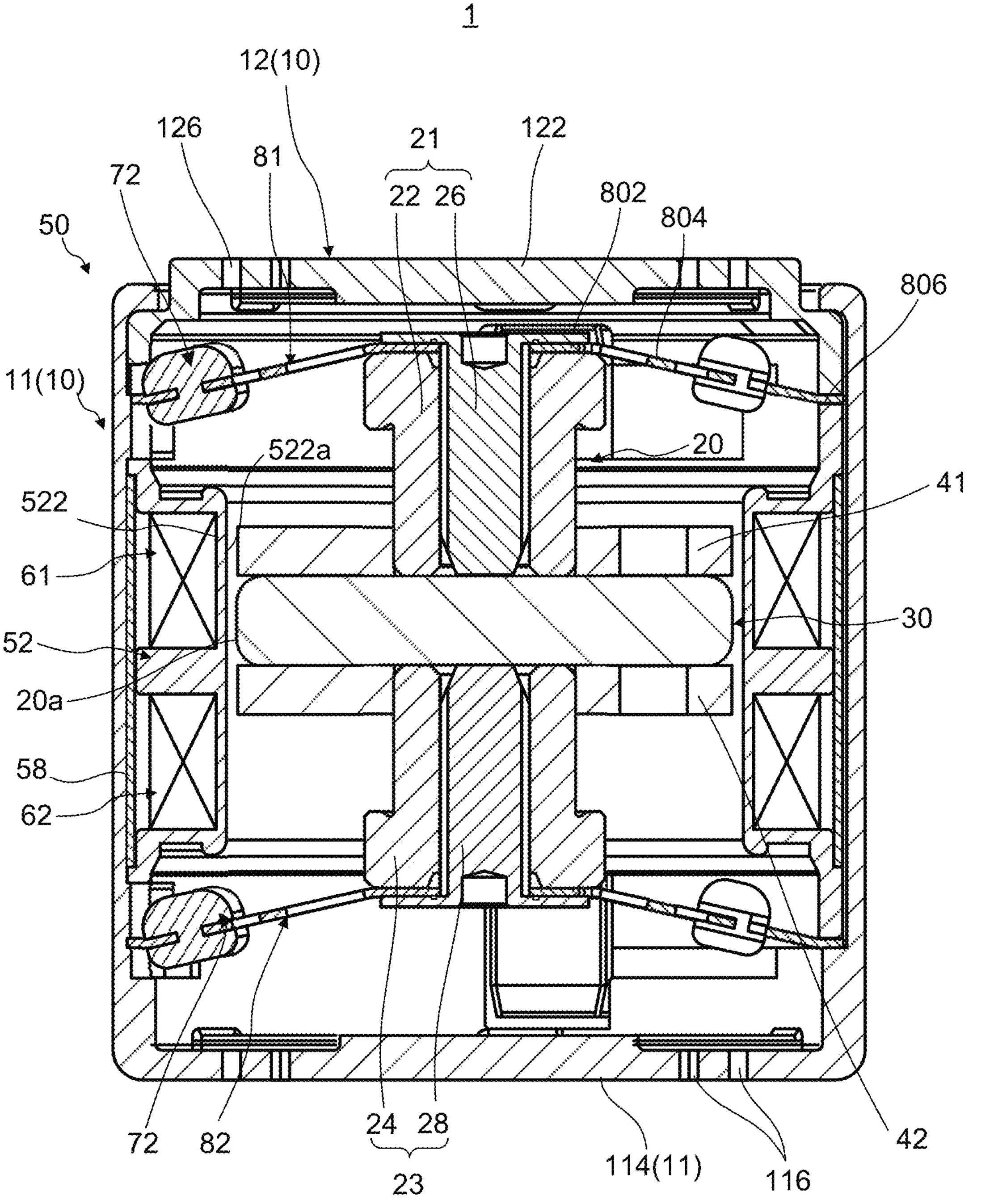
FIG. 11 is a view showing the relative movement state between a coil and a magnet.
Figure 12:
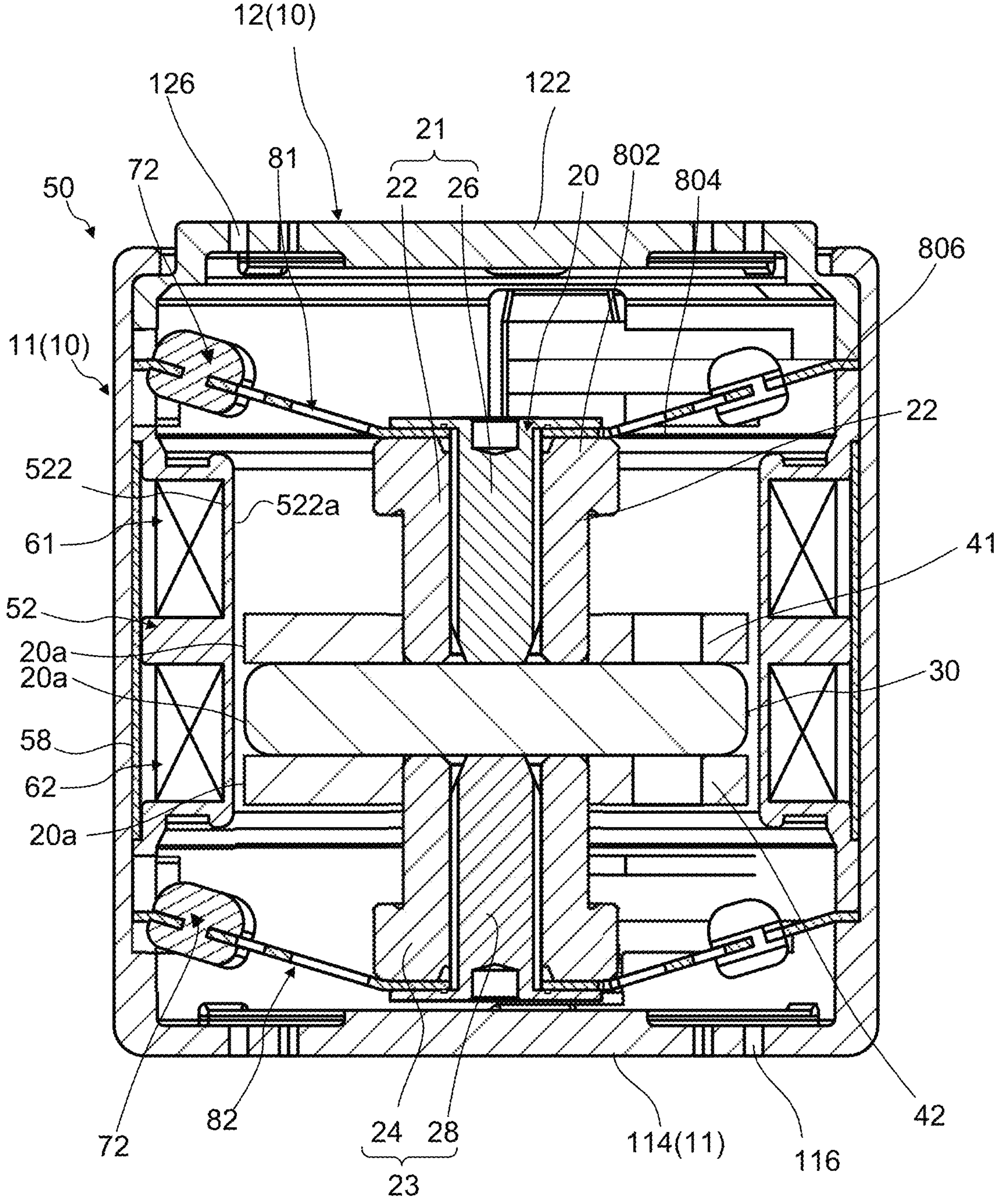
FIG. 12 is a view showing the relative movement state between the coil and the magnet.

FIG. 10 schematically illustrates a magnetic circuit configuration of the vibration actuator. FIGS. 11 and 12 illustrate a state of relative movement between coils 61 and 62 and magnet 30.

With reference to FIG. 10, a description will be given of operation of vibration actuator 1 in relation to one example in which magnet 30 is magnetized such that the side of front surface 30*a*, which is one side of magnet 30 in the magnetization direction (upper side in the figure), is the N-pole, and the side of back surface 30*b*, which is the other side in the magnetization direction (lower side in the figure), is the S-pole.

In vibration actuator 1, movable body 20 is considered to correspond to a mass in a vibration model of a spring-mass system, and a sharp peak is reduced by damping a vibration when a resonance is sharp (has a sharp peak). Damping the vibration makes the resonance less sharp, so that the maximum amplitude value and the maximum movement amount of movable body 20 at the time of resonance do not vary, and vibrations of the suitable and stable maximum movement amount are output.

The magnetic circuit illustrated in FIG. 10 is formed in vibration actuator 1. In vibration actuator 1, coils 61 and 62 are disposed such that the coil axes are orthogonal to the magnetic flux from first and second yokes 41 and 42 and the like sandwiching magnet 30 in the vibration direction.

In the magnetic circuit, flow mf of the magnetic flux is formed which is emitted from the front surface 30*a* side of magnet 30, emitted from first yoke 41 to the coil 61 side, passes through outer yoke 58, and enters magnet 30 via coil 62 from lower second yoke 42 of magnet 30.

Accordingly, when energization is performed as illustrated in FIG. 10, the Lorentz force in the −f direction is generated in coils 61 and 62 by interaction between the magnetic field of magnet 30 and the currents flowing through coils 61 and 62 in accordance with Flemings left hand rule.

The Lorentz force in the −f direction is in a direction orthogonal to the direction of the magnetic field and to the direction of the current flowing through coils 61 and 62. Since coils 61 and 62 are fixed to fixing body 50 (coil bobbin part 52), the opposite force to this Lorentz force in the −f direction is generated in movable body 20 including magnet 30 as thrust in the F direction in accordance with the law of action and reaction. Thus, the side of movable body 20 including magnet 30 moves in the F direction, i.e., toward lid portion 12 (top surface portion 122 of lid portion 12) (see FIG. 11).

Further, when the energization direction of coils 61 and 62 is switched in the opposite direction and coils 61 and 62 are energized, the Lorentz force in a direction reverse to the F direction is generated. The generation of the Lorentz force in this F direction causes in movable body 20 the force opposite to the Lorentz force in the f direction as thrust (thrust in the −F direction) in accordance with the law of action and reaction, so that movable body 20 moves in the −F direction, i.e., toward bottom portion 114 of fixing body 50 (see FIG. 12).

In addition, in vibration actuator 1, a magnetic attraction force acts between magnet 30 and outer yoke 58, which functions as a magnetic spring in a non-driven (non-vibration) state in which actuator 1 is not energized. The magnetic attraction force generated between magnet 30 and outer yoke 58 and a restoring force that brings elastic supporting parts 81 and 82 back to their original shapes cause movable body 20 to return to its original position.

Vibration actuator 1 includes: fixing body 50 including coils 61 and 62; and movable body 20 disposed radially inside coils 61 and 62 and including magnet 30 magnetized in the axial direction of coils 61 and 62. In addition, vibration actuator 1 includes flat plate-like elastic supporting parts 81 and 82 that elastically hold movable body 20 such that movable body 20 is freely movable in the vibration direction that is the coil-axis direction.

Further, coils 61 and 62 are disposed on the outer circumference of bobbin main-body portion 522 of coil bobbin part 52, outer circumferential surface 20*a* of movable body 20 is disposed on the inner circumferential side of bobbin main-body portion 522 with a gap being interposed between the outer circumferential surface of the movable body and the bobbin main-body portion, and coils 61 and 62 are, at the outer circumferential surface thereof, surrounded by outer yoke 58.

Elastic supporting parts 81 and 82 support movable body 20, with a predetermined gap being interposed between movable body 20 and inner circumferential surface 522*a* of bobbin main-body portion 522, in order that movable body 20 does not make contact with inner circumferential surface 522*a* in the non-vibration state and the vibration state of movable body 20.

Further, coils 61 and 62 are disposed on the outer circumference of bobbin main-body portion 522, i.e., coils 61 and 62 are wound on the outer circumference of bobbin main-body portion 522, so that it is possible to reduce the cost as compared with the configuration in which an air-core coil is used. Furthermore, vibration actuator 1 has a structure in which driving unit 13 is accommodated in case 10, so that the outer circumferential surface of circumferential wall portion 112 of case 10 can be formed as a smooth surface. Thus, when vibration actuator 1 is attached to an electronic device, it is possible to reliably and easily perform attachment of a cushioning material such as a sponge to be interposed between vibration actuator 1 and a mounting point.

Coils 61 and 62 are disposed on the outer circumferential side of coil bobbin part 52 that is a coil holding part disposed in case 10. Thus, it is not necessary to perform work of taking out the end portion of a coil wire to the outside, which is required for connection of the coil wire to an external device during assembly in a configuration in which coils 61 and 62 are disposed on the inner circumferential side of the coil holding part.

Moreover, vibration actuator 1 has the configuration in which driving unit 13 is disposed in case 10, so that fixation of elastic supporting parts 81 and 82, which requires high dimensional accuracy, can be achieved by attaching elastic supporting parts 81 and 82 to coil bobbin part 52. Thus, arrangement of movable body 20 including the fixation of elastic supporting parts 81 and 82 can be determined with reference to coil bobbin part 52, so that it is possible to increase the accuracy of the vibration generation direction of the product. Specifically, only increasing the dimensional accuracy of coil bobbin part 52 formed as one component from a resin or the like makes it possible to easily dispose coils 61 and 62 and movable body 20 (magnet 30) attached via elastic supporting parts 81 and 82 in an accurate positional relationship, for example.

Further, outer yoke 58 is attached to coil bobbin part 52 disposed in case 10, so as to surround coils 61 and 62, so that the outer circumferential surface of circumferential wall portion 112 of case 10 form a smooth surface of a resin with good surface accuracy. Thus, a preferable bonding state of a member for attachment of the cushioning material (for example, a double-sided tape) is achieved, and the bonding strength can be increased.

In addition, case 10 is formed by bottomed cylindrical case main body 11 (that is, cup-shaped case main body 11) and by lid portion 12. Thus, the number of parts is less than in a configuration in which circumferential wall portion 112 and bottom portion 114 are separate from each other, and it is possible to improve the assemblability and the impact resistance.

Further, lid portion 12 is fixed by welding or caulking to opening portion 115 of cup-shaped case main body 11. For example, lid portion 12 is fitted into opening portion 115 to close opening portion 115 in case main body 11 after coil bobbin part 52 to which movable body 20 is attached via elastic supporting parts 81 and 82 is accommodated in case main body 11. Then, by welding or similar methods at the fitting part between lid portion 12 and opening portion 115, lid portion 12 is fixed to case main body 11. Also, the shape of opening portion 115 may be formed to extend above lid portion 12 around lid portion 12 placed to close opening portion 115, and the opening edge of opening portion 115 extending over lid portion 12 may be caulked and bent to fix lid portion 12 onto case main body 11.

Note that, in vibration actuator 1, movable body 20 is supported on fixing body 50 with a gap being interposed between the movable body and bobbin main-body portion 522 regardless of whether the movable body is in the moving state or in the non-moving state. Movable body 20 is always supported with respect to fixing body 50 with a gap being interposed between the movable body and bobbin main-body portion 522. Thus, movable body 20 does not make contact with fixing body 50 when moving, i.e., when vibrating. In addition, even when impacted, movable body 20 and bobbin main-body portion 522 move relative to each other in a range between outer circumferential surface 20*a* of movable body 20 and inner circumferential surface 522*a* of bobbin main-body portion 522, and movable body 20 does not make contact with coils 61 and 62.

As described above, vibration actuator 1 has the impact resistance, and is capable of outputting a preferable tactile vibration with high vibrational expressiveness.

Vibration actuator 1 is driven by an AC wave input from the power supplying part (e.g., drive control part 203 illustrated in FIGS. 14 and 15) to coils 61 and 62. That is, the energization direction of coils 61 and 62 are periodically switched, and the thrust in the F direction toward top surface portion 122 of lid portion 12 and the thrust in the −F direction toward bottom portion 114 act alternately on movable body 20. Thus, movable body 20 vibrates in the vibration direction (a winding axis direction of coils 61 and 62 orthogonal to the radial direction of coils 61 and 62, or the magnetization direction of magnet 30).

Hereinbelow, brief descriptions of the driving principle of vibration actuator 1 will be given. In vibration actuator 1 of the present embodiment, movable body 20 vibrates with respect to fixing body 50 at resonance frequency $F_r$ [Hz] computed by following Equation 1 in which m [kg] denotes the mass of movable body 20 and $K_{sp}$ denotes the spring constant of the springs (elastic supporting parts 81 and 82 that are springs).

[1]

$$F_r = \frac{1}{2\pi}\sqrt{\frac{K_{sp}}{m}} \qquad \text{(Equation 1)}$$

Since movable body 20 is considered as a mass in a vibration model of a spring-mass system, movable body 20 is brought into a resonance state when the AC wave of a frequency equal to resonance frequency $F_r$ of movable body 20 is input to coils 61 and 62. That is, movable body 20 can be efficiently vibrated by inputting the AC wave of a frequency being substantially equal to resonance frequency $F_r$ of movable body 20 to coils 61 and 62 from the power supplying part.

The equation of motion and the circuit equation representing the driving principle of vibration actuator 1 are illustrated below. Vibration actuator 1 is driven based on the equation of motion represented by following Equation 2 and based on the circuit equation represented by following Equation 3.

[2]

$$m\frac{d^2x(t)}{dt^2} = K_f i(t) - K_{sp}x(t) - D\frac{dx(t)}{dt} \qquad \text{(Equation 2)}$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

[3]

$$e(t) = Ri(t) + L\frac{di(t)}{dt} + K_e\frac{dx(t)}{dt} \qquad \text{(Equation 3)}$$

e(t): Voltage [V]
R: Resistance [Ω]
L: Inductance [H]
$K_e$: Reverse electromotive force constant [V/(rad/s)]

That is, mass m [Kg], displacement x(t) [m], thrust constant $K_f$ [N/A], current i(t) [A], spring constant $K_{sp}$ [N/m], damping coefficient D [N/(m/s)], and the like of vibration actuator 1 may be changed appropriately as long as Equation 2 is satisfied. In addition, voltage e(t) [V], resistance R [Ω], inductance L [H], and counter electromotive force constant $K_e$ [V/(rad/s)] may be changed appropriately as long as Equation 3 is satisfied.

Accordingly, in vibration actuator 1, a great vibrational output can be obtained efficiently when the energization of coils 61 and 62 is performed using the AC wave corresponding to resonance frequency $F_r$ determined by mass m of movable body 20 and spring constant $K_{sp}$ of elastic supporting parts 81 and 82 that are leaf springs.

In addition, vibration actuator 1 satisfies Equations 2 and 3, and is driven by using a resonance phenomenon expressed using a resonance frequency indicated by Equation 1. Thus, in vibration actuator 1, the power consumed in a steady state is only loss caused by damping parts 72, so that vibration actuator 1 is capable of being driven with low power consumption, i.e., movable body 20 is capable of linear reciprocating vibration with low power consumption. Further, vibrations in higher bands can be generated by increasing damping coefficient D.

According to the present embodiment, plate-like elastic supporting parts 81 and 82 are disposed above and below (in the vibration direction) movable body 20, so that movable body 20 is stably driven in the upper-lower direction, and the magnetic flux of coils 61 and 62 can be efficiently distributed from upper and lower elastic supporting parts 81 and 82 above and below magnet 30. Thus, vibration actuator 1 is capable of achieving a high output vibration.

(Features of Movable Body 20)

Figure 13:
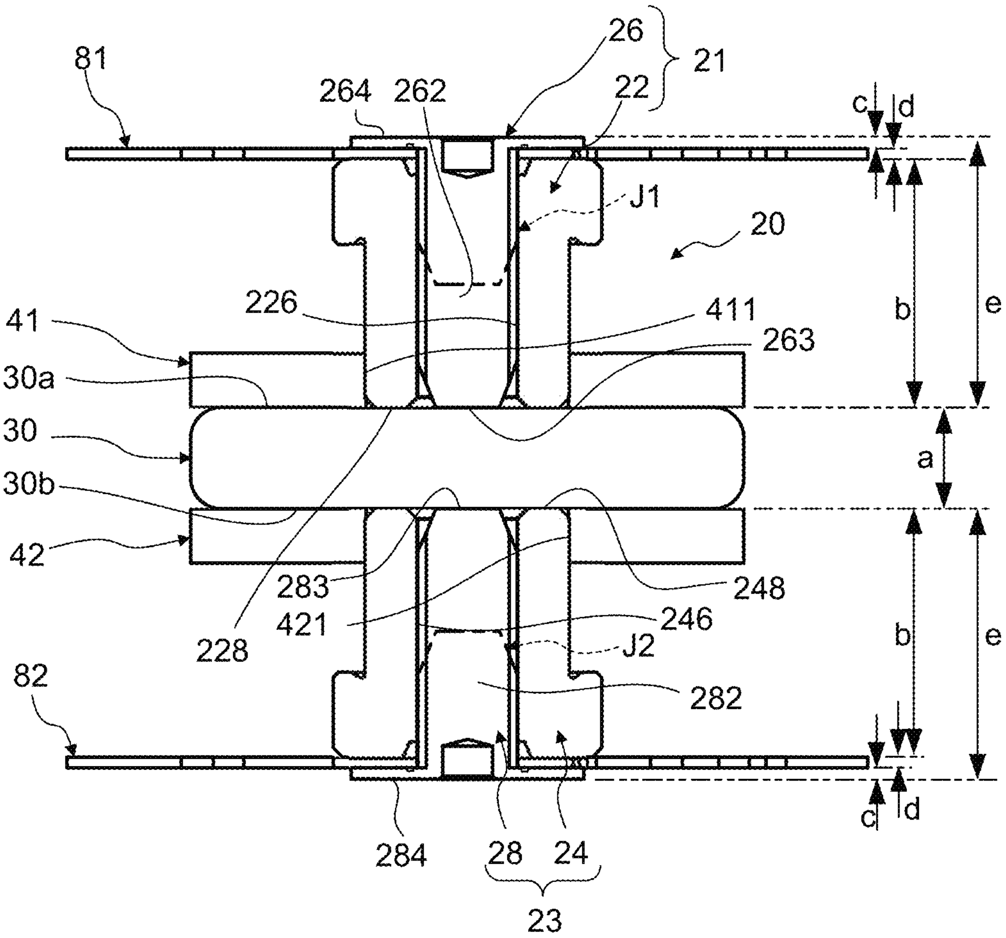
FIG. 13 is a schematic diagram showing the components of the entire length of a movable body.

In vibration actuator 1 of this embodiment, as shown in FIG. 13, movable body 20 is arranged inside bobbin main-body portion 522 having the coil, such that the movable body is sandwiched between plate-shaped elastic supporting parts 81 and 82.

Movable body 20 has disc-shaped magnet 30 at the center. Movable body 20 includes: movable stacked body 15 in which a pair of yokes 41 and 42 with fitting openings 411 and 421 are stacked on front and back surfaces **30*a* and 30*b* in the axial direction of magnet 30; and a pair of connecting parts 21 and 23. The pair of connecting parts 21 and 23 respectively include tubular members 22 and 24 and shaft members 26 and 28 inserted into tubular members 22 and 24 and having flanges 264 and 284** at their base ends.

Shaft members 26 and 28 are inserted into fitting openings 411 and 421, and their tip ends 263 and 283 are in contact with front and back surfaces **30*a* and 30*b* of magnet 30. In addition, the tip-end-side end surfaces of tubular members 22 and 24, together with tip ends 263 and 283 of shaft members 26 and 28 inserted into tubular members 22 and 24, are in contact with front and back surfaces 30*a* and 30*b* of magnet 30 inside fitting openings 411 and 421 of the pair of yokes 41 and 42**.

The pair of elastic supporting parts 81 and 82 are clamped by connecting parts 21 and 23 at the central portions (inner circumferential portions 802) and connected to fixed body 50 at the outer circumferential portions (outer circumferential fixing portions 806). Fixed body 50 houses therein movable body 20 such that the movable body is capable of a reciprocating vibration in the axial direction, and includes coils 61 and 62 arranged on the radially outer side of movable body 20.

The total length of movable body 20 is thickness a of magnet 30 at the central part+length e of the shaft member×2, and is composed of only three parts.

The configuration is such that pin main bodies 262 and 282 of shaft members 26 and 28 are in contact with front and back surfaces **30*a* and 30*b* of magnet 30. Therefore, the total length of movable body 20 itself attached to elastic supporting parts 81 and 82 is set only by the total axial dimensions of the three components (shaft members 26 and 28, and magnet 30**).

A shaft member in which pin main bodies 262 and 282 of shaft members 26 and 28 do not contact magnet 30 is indicated by shaft member J1. When this shaft member J1 is used in place of shaft members 26 and 28 in vibration actuator 1, the total length of the movable body is thickness a of the magnet+thickness d of the elastic supporting part×2+length b of the tubular member×2+thickness c of the shaft member×2. Thus, according to this embodiment, the number of parts constituting the total length of movable body 20 can be significantly reduced.

That is, since the number of parts related to the total length of movable body 20 is reduced, dimensional errors due to an increase in the number of parts are less likely to occur. Therefore, it is possible to improve the dimensional stability of the total length of movable body 20, and by stabilizing the vibration characteristics, it is possible to maximize the voltage input to coils 61 and 62.

According to the present embodiment, it is possible to generate a suitable tactile vibration with a stable high output even when vibration is damped. In addition, it is possible to achieve vibration actuator 1 that is miniaturized at a low cost, is impact-resistant, is quieter, and has stable performance.

Further, fixing body 50 includes coil bobbin part 52 that has a holding function of holding coils 61 and 62 and a protecting function of protecting coils 61 and 62 from movable body 20. Thus, even when fixing body 50 is impacted, fixing body 50 withstands the impact, and prevents damage such as deformation of elastic supporting parts 81 and 82. Further, an impact is to be transmitted to coils 61 and 62 via bobbin main-body portion 522 formed from resin, so that damage can be reduced, and thus, highly reliable vibration actuator 1 can be achieved.

(Electronic Device)

Figure 14:
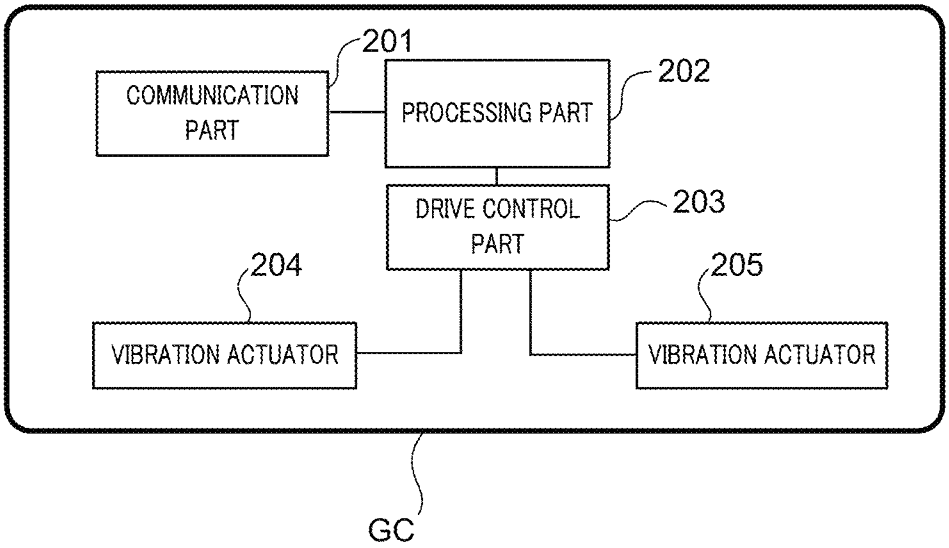
FIG. 14 is a view showing an example of an electronic device in which the vibration actuator is mounted.
Figure 15:
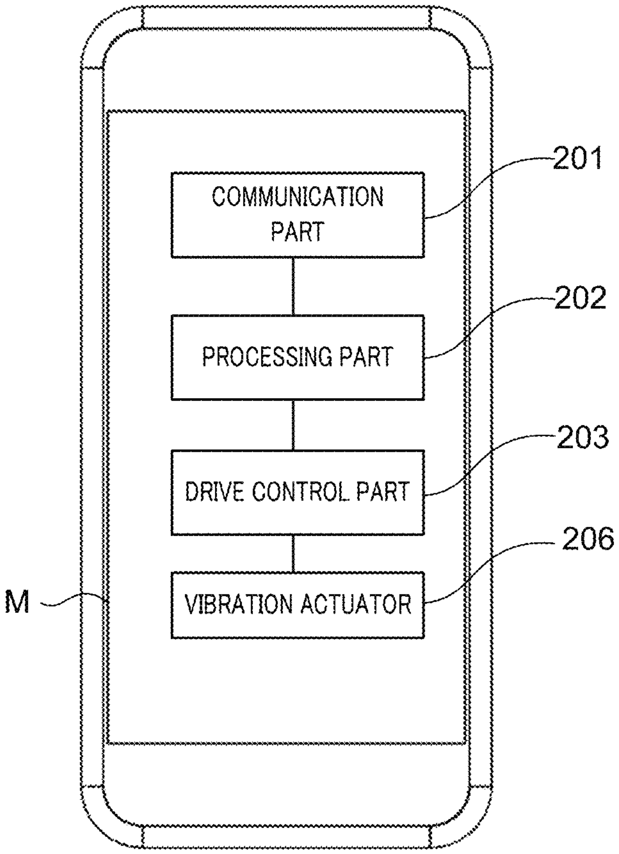
FIG. 15 is a view showing an example of the electronic device in which the vibration actuator is mounted.

FIGS. 14 and 15 illustrate exemplary mounting configurations of vibration actuator 1. FIG. 14 illustrates an example in which vibration actuator 1 is mounted on game controller GC, and FIG. 15 illustrates another example in which vibration actuator 1 is mounted on mobile terminal M.

Game controller GC is connected to a game-machine main body by wireless communication, for example, and is used by a user gripping or holding it. Here, game controller GC has a rectangular plate shape, and the user grasps the left and right sides of game controller GC with both hands for operation.

Game controller GC notifies the user of a command from the game-machine main body by vibrations. Note that, game controller GC includes a function other than command notification (for example, an input operation part for input operation to the game-machine main body), which is not illustrated in the figures though.

Mobile terminal M is a portable communication terminal, such as a mobile phone or smartphone, for example. Mobile terminal M vibrates to notify a user of an incoming call from an external communication apparatus and also to implement functions of mobile terminal M (for example, functions of giving an operational feel and/or realism).

As illustrated in FIGS. 14 and 15, each of game controller GC and mobile terminal M has communication part 201, processing part 202, drive control part 203, and vibration actuators 204, 205, and/or 206 each of which is vibration actuator 1 as a driving part. Note that, a plurality of vibration actuators 204 and 205 are mounted in game controller GC.

In game controller GC and mobile terminal M, it is preferable that vibration actuators 204, 205, and/or 206 be mounted such that the main surface of the terminal is parallel to the surfaces of vibration actuators 204, 205, and/or 206 (here, the bottom surface of bottom portion 114) which are orthogonal to the vibration direction. The main surface of the terminal is a surface that makes contact with the body surface of the user, and means a vibration transmission surface that makes contact with the body surface of the user to transmit vibrations in the present embodiment. Note that, the main surface of the terminal and the bottom surfaces of bottom portions 114 of vibration actuators 204, 205, and/or 206 may also be disposed to be orthogonal to one another.

Specifically, vibration actuators 204 and 205 are mounted in game controller GC such that the vibration direction is orthogonal to the surface with which the fingertip, the pad of the finger, the palm of the hand, and/or the like of the user operating the game controller make contact, or the surface on which the operation part is disposed. Further, in the case of mobile terminal M, vibration actuator 206 is mounted such that a display screen (touch panel surface) is orthogonal to the vibration direction. Thus, vibrations in a direction orthogonal to the main surface of game controller GC or mobile terminal M are transmitted to the user.

Communication part 201 is connected to an external communication apparatus by wireless communication, and receives a signal from the communication apparatus to output it to processing part 202. In the case of game controller GC, the external communication apparatus is a game-machine main body as an information communication terminal, and performs communication in accordance with short-range radio communication standards such as Bluetooth (registered trademark) and the like. In the case of mobile terminal M, the external communication apparatus is, for example, a base station, and performs communication in accordance with mobile communication standards.

Processing part 202 converts by using a conversion circuit part (not illustrated) an input signal into a drive signal for driving vibration actuators 204, 205, and/or 206, and outputs the drive signal to drive control part 203. Note that, in mobile terminal M, processing part 202 generates a drive signal based on a signal input from communication part 201 and on signals input from various functional parts (not illustrated; for example, an operation part such as a touch panel or the like).

Drive control part 203 is connected to vibration actuators 204, 205, and/or 206, and a circuit for driving vibration actuators 204, 205, and/or 206 is implemented in drive control part 203. Drive control part 203 supplies a drive signal to vibration actuators 204, 205, and/or 206.

Vibration actuators 204, 205, and/or 206 are driven in accordance with the drive signal from drive control part 203. Specifically, in vibration actuators 204, 205, and/or 206, movable body 20 vibrates in the direction orthogonal to the main surface of game controller GC or mobile terminal M.

Movable body 20 may make contact with top surface portion 122 of lid portion 12 or with bottom portion 114 via the dampers each time movable body 20 vibrates. In this case, an impact on top surface portion 122 of lid portion 12 or bottom portion 114 due to the vibration of movable body 20, i.e., the impact on the housing is directly transmitted as vibrations to the user. In particular, a plurality of vibration actuators 204 and 205 are mounted in game controller GC, so that it is possible to drive one of the plurality of vibration actuators 204 and 205 or both of the of vibration actuators 204 and 205 at the same time depending on the input drive signal.

Since the vibration in the direction orthogonal to the body surface of the user is transmitted to the body surface of the user in contact with game controller GC or mobile terminal M, a sufficient tactile vibration can be given to the user. Game controller GC is capable of giving a tactile vibration to the user with one or both of vibration actuators 204 and 205, so that application of vibrations with high vibrational expressiveness, such as selective application of at least strong or weak vibrations is possible.

Thus, by using the vibration actuator of the present embodiment, in game controller GC or portable terminal M, it is possible to stably obtain excellent vibration characteristics, and it is possible to realize quiet driving.

Case 10 is composed of bottomed cylindrical case main body 11 and lid portion 12, but the shape is not limited to these, and any shape that can accommodate the drive unit is acceptable.

Case body 11 may be a first case and lid portion 12 may be a second case, and each of them may be formed in a bottomed cylindrical shape, or case main body 11 may be divided into a bottom portion and a circumferential wall portion without changing lid portion 12. Further, the case may be composed of three or more divided pieces, such as a top plate portion, a bottom portion, and a circumferential wall portion.

While the invention made by the present inventors has been specifically described based on the preferred embodiment, it is not intended to limit the present invention to the above-mentioned preferred embodiment, but the present invention may be further modified within the scope and spirit of the invention defined by the appended claims.

The vibration actuator according to the present invention is also suitable for application to portable devices other than game controller GC and mobile terminal M (for example, a portable information terminal such as a tablet PC, a portable game terminal, or a wearable terminal worn and used by a user). Vibration actuator 1 of the present embodiment can be used not only in the above-described portable device but also in an electric barber and beauty instrument such as a beauty massager requiring vibration.

The disclosure of Japanese Patent Application No. 2022-088795, filed on May 31, 2022, including the specification, drawings and abstract, is incorporated herein by reference in its entirety.

INDUSTRIAL APPLICABILITY

The vibration actuator according to the present invention is useful as a vibration actuator which is capable of being made small and thin and vibrating stably and with high output, and which is mounted on an electronic device such as a game machine terminal or a portable terminal.

REFERENCE SIGNS LIST

1 Vibration actuator
10 Case
11 Case main body
12 Lid portion
13 Drive unit
15 Movable stacked body

20 Movable body
20*a* Outer circumferential surface
20*b* Movable-body-side flat surface portion
21, 23 Connecting part
22, 24 Tubular member
26 First shaft member
28 Second shaft member
30 Magnet
30*a* Front surface
30*b* Back surface
41 First yoke
42 Second yoke
50 Fixed body
52 Coil bobbin part
52*b*, 52*c* Coil attachment portion
53, 53-1, 53-2 Terminal tying part
54 Movable-range forming part
58 Outer yoke
61, 62 Coil
72 Damping part
81, 82 Elastic supporting parts
102 Cutout portion
112 Circumferential wall portion
114 Bottom portion
115 Opening portion
116, 126 Vent hole
118 Step portion
122 Top surface portion
124 Hanging portion
128 Pressing portion
201 Communication part
202 Processing part
203 Drive control part
204, 205, 206 Vibration actuator
222, 242 Insertion tubular portion
224, 244 Joining tubular portion
262, 282, 362 Pin main body (shaft member)
264, 284, 364 Flange
268, 288, 368 Slit (groove portion)
362*a* Frustum portion
411, 421 Fitting opening (opening portion)
522 Bobbin main-body portion
522*a* Inner circumferential surface
526 Middle flange portion
527, 528 Flange portion
527*a* Upper end surface
528*a* Lower end surface
529 Positioning engagement portion
582 Opening portion
589 Engaged portion
802 Inner circumferential portion
804 Deformation arm portion
806 Outer circumferential fixing portion
806*a* Outermost circumferential portion
806*b* Inner bulging portion
808 Positioning groove

The invention claimed is:

1. A vibration actuator, comprising:

a movable stacked body including a magnet and a pair of yokes, the yokes being fixed respectively to a front surface and a back surface of the magnet and including opening portions at centers, respectively;

a fixed body including a coil and being configured to support the movable stacked body inside the coil such that the movable stacked body is capable of a reciprocating vibration in an axial direction via a pair of elastic supporting parts;

a pair of connecting parts, each of which includes a tubular member and a shaft member, the shaft member being inserted into the tubular member and including a flange at a base end, wherein each of the pair of connecting parts connects the movable stacked body to a corresponding one of the pair of elastic supporting parts by sandwiching the elastic supporting part between the flange of the shaft member and a base-end-side end surface of the tubular member in a state where a tip end of the shaft member is in contact with the front surface or the back surface of the magnet inside a corresponding one of the opening portions of the pair of yokes.

2. The vibration actuator according to claim 1, wherein a tip-end-side end surface of the tubular member is in contact with the front surface or the back surface of the magnet inside a corresponding one of the opening portions of the pair of yokes, together with the tip end of the shaft member inserted into the tubular member.

3. The vibration actuator according to claim 1, wherein a groove portion extending from the tip end to the base end of the shaft member is formed in an outer circumferential surface of the shaft member.

4. The vibration actuator according to claim 1, wherein the shaft member is a rivet and is press-fitted into the tubular member.

5. The vibration actuator according to claim 1, wherein an outer diameter of the tubular member is larger at a base end portion having the base-end-side end surface than at a tip end portion inserted into the opening portion and having a tip-end-side end surface.

6. The vibration actuator according to claim 1, wherein each of the elastic supporting parts includes a flat plate-shaped spiral spring.

7. An electronic device, in which the vibration actuator according to claim 1 is mounted.

* * * * *